(12) United States Patent
Ma et al.

(10) Patent No.: US 10,911,767 B2
(45) Date of Patent: Feb. 2, 2021

(54) MOTION COMPENSATING PREDICTION METHOD AND APPARATUS

(71) Applicant: Huawei Technologies Co., Ltd., Shenzhen (CN)

(72) Inventors: Xiang Ma, Shenzhen (CN); Haitao Yang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 31 days.

(21) Appl. No.: 16/385,600

(22) Filed: Apr. 16, 2019

(65) Prior Publication Data

US 2019/0273936 A1 Sep. 5, 2019

Related U.S. Application Data

(63) Continuation of application No. PCT/CN2017/105879, filed on Oct. 12, 2017.

(30) Foreign Application Priority Data

Oct. 16, 2016 (CN) .......................... 2016 1 0899888

(51) Int. Cl.
*H04N 19/51* (2014.01)
*H04N 19/182* (2014.01)
(Continued)

(52) U.S. Cl.
CPC .......... *H04N 19/51* (2014.11); *H04N 19/182* (2014.11); *H04N 19/513* (2014.11); *H04N 19/59* (2014.11); *H04N 19/597* (2014.11)

(58) Field of Classification Search
CPC .... H04N 19/176; H04N 19/523; H04N 19/50; H04N 19/182; H04N 19/59;
(Continued)

(56) References Cited

U.S. PATENT DOCUMENTS 6,683,608 B2 1/2004 Golin et al.
10,045,046 B2 * 8/2018 Panchal ................. H04N 19/80
(Continued)

FOREIGN PATENT DOCUMENTS

CN 101002474 A 7/2007
CN 103716641 A 4/2014
(Continued)

OTHER PUBLICATIONS

Ma, X., "Co-projection-plane based motion compensated prediction for cubic format VR content," XP030150294, Joint Video Exploration Team (JVET) of ITU-T SG 16 WP 3 and ISO/IEC JTC 1/SC 29/WG 11, 4th Meeting: Chengdu, JVET-D0061, Oct. 15-21, 2016, 4 pages.

(Continued)

*Primary Examiner* — Jingge Wu
(74) *Attorney, Agent, or Firm* — Conley Rose, P.C.

(57) ABSTRACT

A motion compensating prediction method includes: determining a location of an initial reference pixel of a current pixel in a reference image, where the current pixel is located in a first sub-image in a current image, when the initial reference pixel is located outside a second sub-image at a location corresponding to the first sub-image in the reference image, determining a location of a target reference pixel of the current pixel in the reference image based on the location of the initial reference pixel, where location precision of the target reference pixel is limited to being less than or equal to preset pixel location precision, and determining a predicted value of a pixel value of the current pixel based on a pixel value of the target reference pixel and/or a pixel value of a neighboring pixel of the target reference pixel.

19 Claims, 16 Drawing Sheets

(51) Int. Cl.
*H04N 19/59* (2014.01)
*H04N 19/597* (2014.01)
*H04N 19/513* (2014.01)

(58) Field of Classification Search
CPC ...... H04N 19/513; H04N 19/52; H04N 19/51; H04N 19/597; G06T 7/248
See application file for complete search history.

(56) References Cited

U.S. PATENT DOCUMENTS

| | | | |
|---|---|---|---|
| 2003/0202607 A1 | 10/2003 | Srinivasan | |
| 2006/0034523 A1 | 2/2006 | Park | |
| 2008/0075169 A1* | 3/2008 | Ugur | H04N 19/523 375/240.16 |
| 2008/0165848 A1* | 7/2008 | Ye | H04N 19/187 375/240.13 |
| 2012/0189057 A1* | 7/2012 | Ugur | H04N 19/523 375/240.15 |
| 2014/0267243 A1* | 9/2014 | Venkataraman | H04N 13/106 345/419 |
| 2014/0362921 A1* | 12/2014 | Puri | H04N 19/119 375/240.16 |
| 2016/0295231 A1* | 10/2016 | Ugur | H04N 19/533 |
| 2017/0054998 A1* | 2/2017 | Ugur | H04N 19/50 |
| 2017/0171557 A1* | 6/2017 | Ugur | H04N 19/53 |
| 2017/0339426 A1* | 11/2017 | Lee | H04N 19/51 |
| 2017/0353719 A1* | 12/2017 | Liu | H04N 19/176 |
| 2018/0027257 A1* | 1/2018 | Izumi | G06T 9/00 386/328 |
| 2019/0158875 A1* | 5/2019 | Yu | H04N 19/105 |

FOREIGN PATENT DOCUMENTS

| | | |
|---|---|---|
| CN | 104010180 A | 8/2014 |
| CN | 105137705 A | 12/2015 |
| CN | 105245838 A | 1/2016 |
| CN | 105898344 A | 8/2016 |
| CN | 105959702 A | 9/2016 |
| JP | 2013046270 A | 3/2013 |
| WO | 2016140060 A1 | 9/2016 |

OTHER PUBLICATIONS

Foreign Communication From a Counterpart Application, European Application No. 17860837.8, Extended European Search Report dated Aug. 13, 2019, 8 pages.
Machine Translation and Abstract of Japanese Publication No. JP2013046270, Mar. 4, 2013, 25 pages.
Machine Translation and Abstract of Chinese Publication No. CN104010180, Aug. 27, 2014, 44 pages.
Machine Translation and Abstract of Chinese Publication No. CN105137705, Dec. 9, 2015, 16 pages.
Machine Translation and Abstract of Chinese Publication No. CN105245838, Jan. 13, 2016, 14 pages.
Machine Translation and Abstract of Chinese Publication No. CN105898344, Aug. 24, 2016, 15 pages.
Machine Translation and Abstract of Chinese Publication No. CN105959702, Sep. 21, 2016, 30 pages.
Foreign Communication From a Counterpart Application, Chinese Application No. 201610899888.6, Chinese Office Action dated May 7, 2019, 3 pages.
Foreign Communication From a Counterpart Application, Chinese Application No. 201610899888.6, Chinese Search Report dated Apr. 24, 2019, 2 pages.
Foreign Communication From a Counterpart Application, PCT Application No. PCT/CN2017/105879, English Translation of International Search Report dated Dec. 29, 2017, 3 pages.
Foreign Communication From a Counterpart Application, PCT Application No. PCT/CN2017/105879, English Translation of Written Opinion dated Dec. 29, 2017, 4 pages.

* cited by examiner

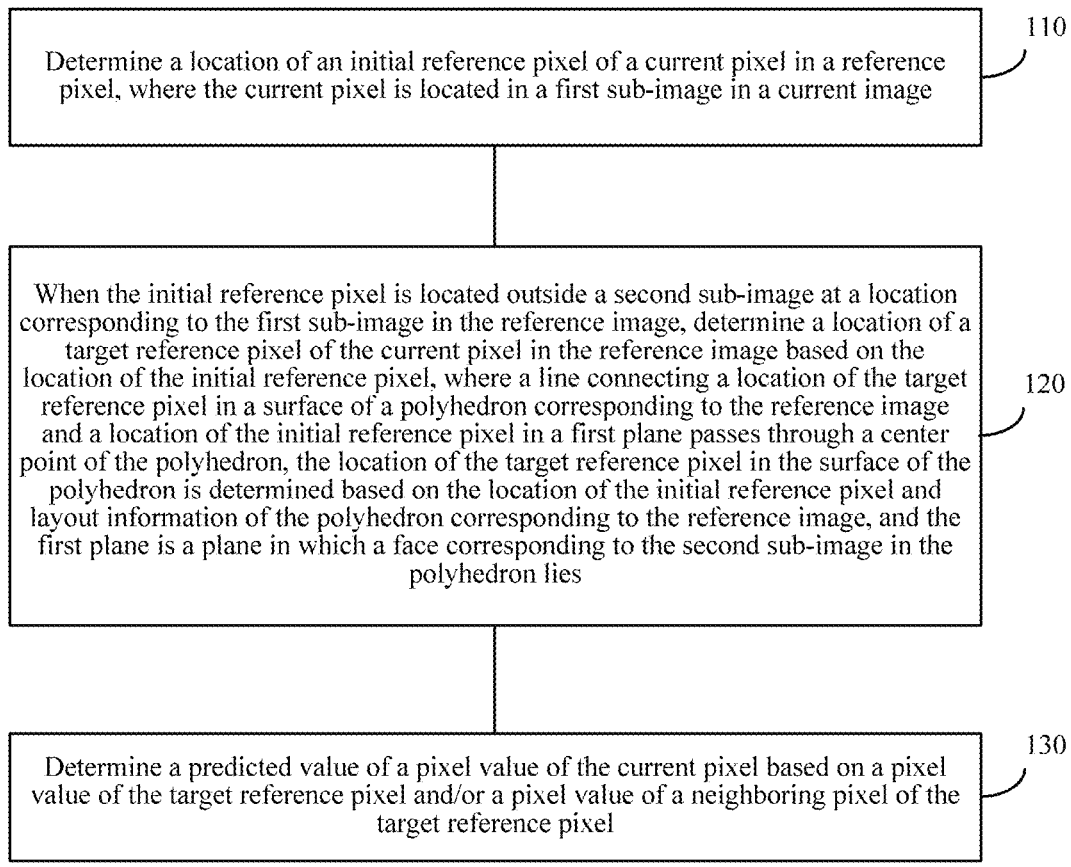
FIG. 5
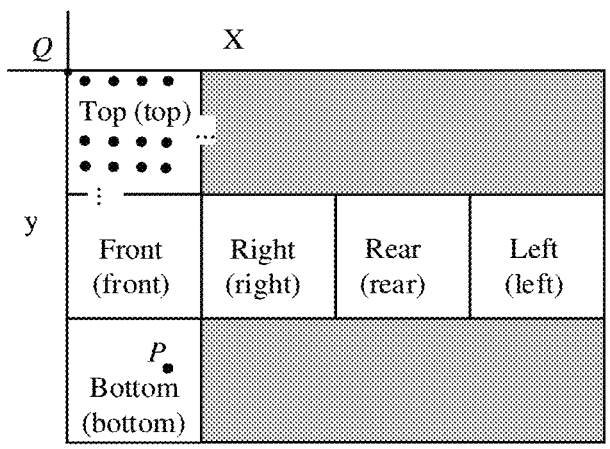
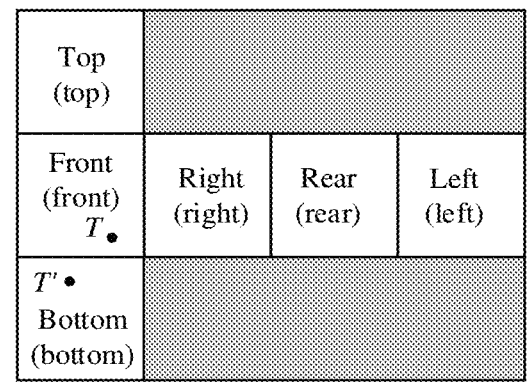
FIG. 6A    FIG. 6B

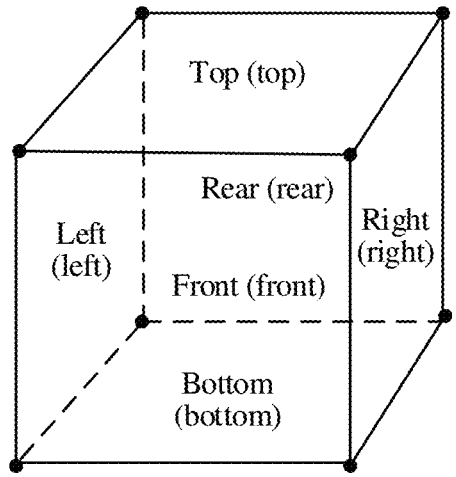
FIG. 7A
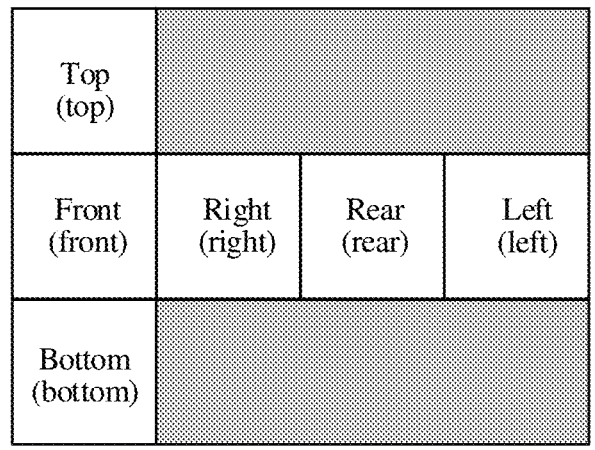
FIG. 7B
| Top (top) | Bottom (bottom) | Left (left) |
|---|---|---|
| Front (front) | Right (right) | Rear (rear) |
FIG. 7C
| Top (top) | Front (front) | Right (right) |
|---|---|---|
| Bottom (bottom) | Rear (rear) | Left (left) |
FIG. 7D
| Top (top) | Front (front) | Right (right) | Rear (rear) | Left (left) | Bottom (bottom) |
|---|---|---|---|---|---|
FIG. 7E
| Right (right) | Front (front) | Rear (rear) | Top (top) | Bottom (bottom) | Left (left) |
|---|---|---|---|---|---|
FIG. 7F Determine a location of an initial reference pixel of a current pixel in a reference pixel, where the current pixel is located in a first sub-image in a current image — 210

When the initial reference pixel is located outside a second sub-image at a location corresponding to the first sub-image in the reference image, determine a location of a target reference pixel of the current pixel in an expansion area of the second sub-image, where the expansion area of the second sub-image is located outside the second sub-image, the expansion area includes a plurality of pixels, a pixel value of any first pixel in the expansion area is determined based on a pixel value of a second pixel in the reference image, a line connecting a location of the second pixel in a surface of a polyhedron formed by the reference image and a location of the first pixel in a first plane passes through a center point of the polyhedron, the location of the second pixel in the face of the polyhedron is determined based on the location of the first pixel and layout information of the polyhedron corresponding to the reference image, and the first plane is a plane in which a face corresponding to the second sub-image in the polyhedron lies — 220

Determine a predicted value of a pixel value of the current pixel based on a pixel value of the target reference pixel and/or a pixel value of a neighboring pixel of the target reference pixel — 230

FIG. 14

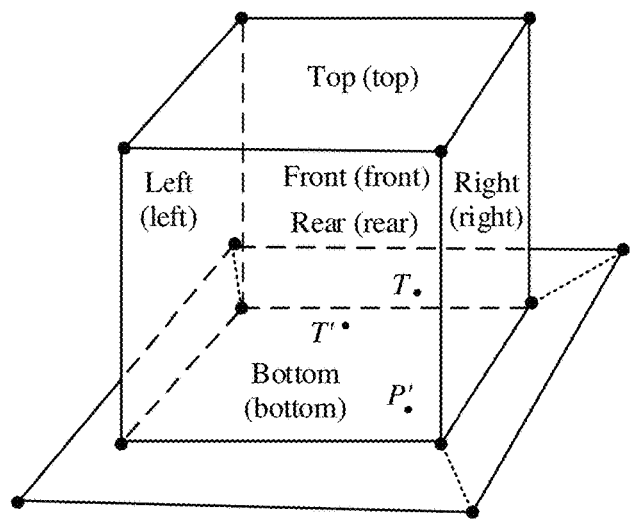
FIG. 15A
FIG. 15B
FIG. 15C
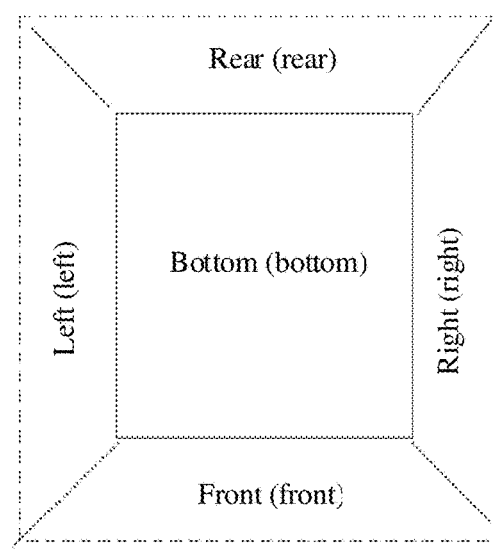
FIG. 15D

MOTION COMPENSATING PREDICTION METHOD AND APPARATUS

CROSS-REFERENCE TO RELATED APPLICATIONS

This application is a continuation of International Application No. PCT/CN2017/105879, filed on Oct. 12, 2017, which claims priority to Chinese Patent Application No. 201610899888.6, filed on Oct. 16, 2016. The disclosures of the aforementioned applications are hereby incorporated by reference in their entireties.

TECHNICAL FIELD

The present disclosure relates to the field of image processing, and more specifically to a motion compensating prediction method and device.

BACKGROUND

During processing of a spherical panorama image (which is referred to as a spherical image for short below), the spherical image is usually projected as a two-dimensional planar panorama image (which is referred to as a two-dimensional image for short below) in a polyhedral format first, and then the two-dimensional image in the polyhedral format is encoded or decoded.

When motion compensating prediction is performed on the two-dimensional image in the polyhedral format, a location of a reference pixel of a current pixel is usually determined first, and then a pixel value of the current pixel is predicted based on a pixel value of the reference pixel. In a motion compensating prediction process in the prior art, regardless of whether a reference pixel is located in a face in which a current pixel is located, a pixel value of the current pixel is predicted based on a pixel value at a location of the reference pixel. When the reference pixel is not located in the face in which the current pixel is located, an area in which faces are connected is distorted because faces in a two-dimensional image in a polyhedral format are not in a same projection plane. Consequently, an effect of predicting the pixel value of the current pixel based on the pixel value at the location of the reference pixel is relatively poor.

SUMMARY

The present disclosure provides a motion compensating prediction method and a motion compensating prediction apparatus, to improve a motion compensating prediction effect.

According to a first aspect, a motion compensating prediction method is provided. The method includes determining a location of an initial reference pixel of a current pixel in a reference image, where the current pixel is located in a first sub-image in the current image, when the initial reference pixel is located outside a second sub-image at a location corresponding to the first sub-image in the reference image, determining a location of a target reference pixel of the current pixel in the reference image based on the location of the initial reference pixel, where a line connecting a location of the target reference pixel in a surface of a polyhedron corresponding to the reference image and a location of the initial reference pixel in a first plane passes through a center point of the polyhedron, the location of the target reference pixel in the surface of the polyhedron is determined based on the location of the initial reference pixel and layout information of the polyhedron corresponding to the reference image, the first plane is a plane in which a face corresponding to the second sub-image in the polyhedron lies, and location precision of the target reference pixel is limited to being less than or equal to preset pixel location precision, and determining a predicted value of a pixel value of the current pixel based on a pixel value of the target reference pixel and/or a pixel value of a neighboring pixel of the target reference pixel.

When the initial reference pixel is located outside the second sub-image, due to impact of geometric distortion of a sub-image boundary of a two-dimensional image, it is inaccurate to predict the current pixel directly based on the initial reference pixel. Therefore, in this case, in the present disclosure, the target reference pixel that can really provide a reference effect is found based on the location of the initial reference pixel, and then the pixel value of the current pixel is predicted based on the target reference pixel, thereby improving accuracy of motion compensating prediction.

The second sub-image is a sub-image that is in the reference image and that is at the location corresponding to the first sub-image in the current image. For example, polyhedrons that both the current image and the reference image correspond are regular hexahedrons, and formats of both the current image and the reference image are 4×3. Assuming that the first sub-image in the current image corresponds to a bottom face of the regular hexahedron corresponding to the current image, the second sub-image in the reference image also corresponds to a bottom face of the regular hexahedron corresponding to the reference image.

The polyhedron corresponding to the reference image may be set on the reference image. In this case, an anchor face of the polyhedron is a face in which an area of the second sub-image in the reference image lies, and the anchor face is a reference face when the polyhedron is unfolded. For example, when a polyhedron is unfolded, a bottom face of the polyhedron is placed on a plane, and then other faces of the polyhedron are folded onto the plane. In this case, a location of the bottom face in the plane is unchanged, and other faces of the polyhedron are folded onto other areas of the plane. Therefore, the bottom face is an anchor face of the polyhedron.

With reference to the first aspect, in a first implementation of the first aspect, the method further includes determining, based on the layout information of the reference image and the location of the initial reference pixel, whether the initial reference pixel is located outside the second sub-image in the reference image.

Whether the initial reference pixel is located outside the second sub-image in the reference image is determined such that when the initial reference pixel is not located in the second sub-image, the pixel value of the current pixel is predicted directly based on the initial reference pixel without determining the target reference pixel based on the initial reference pixel.

With reference to the first aspect or the first implementation of the first aspect, in a second implementation of the first aspect, the determining a location of a target reference pixel of the current pixel in the reference image based on the location of the initial reference pixel includes determining the location of the target reference pixel in the surface of the polyhedron based on the location of the initial reference pixel and the layout information of the reference image, where the location of the target reference pixel in the surface of the polyhedron is an intersection point between the surface of the polyhedron and a line connecting the initial reference pixel and the center point of the polyhedron, and determining the location of the target reference pixel in the reference image based on the location of the target reference pixel in the surface of the polyhedron and the layout information of the reference image.

With reference to the second implementation of the first aspect, in a third implementation of the first aspect, the determining the location of the target reference pixel in the surface of the polyhedron based on the location of the initial reference pixel and the layout information of the reference image includes determining the location of the initial reference pixel in the first plane based on the location of the initial reference pixel and the layout information of the reference image, and determining the location of the target reference pixel in the surface of the polyhedron based on the location of the initial reference pixel in the first plane and the layout information of the reference image.

With reference to any one of the first aspect and the first to the third implementations of the first aspect, in a fourth implementation of the first aspect, the layout information includes at least one of face quantity information of the polyhedron, sub-image arrangement manner information of the reference image, sub-image arrangement order information of the reference image, and sub-image rotation information of the reference image.

With reference to any one of the first aspect and the first to the fourth implementations of the first aspect, in a fifth implementation of the first aspect, the determining a predicted value of a pixel value of the current pixel based on a pixel value of the target reference pixel and/or a pixel value of a neighboring pixel of the target reference pixel includes determining the pixel value of the target reference pixel as the predicted value of the pixel value of the current pixel.

With reference to any one of the first aspect and the first to the fourth implementations of the first aspect, in a sixth implementation of the first aspect, the determining a predicted value of a pixel value of the current pixel based on a pixel value of the target reference pixel and/or a pixel value of a neighboring pixel of the target reference pixel includes weighting the pixel value of the target reference pixel and the pixel value of the neighboring pixel of the target reference pixel, and determining a pixel value that is at the location of the target reference pixel and that is obtained through the weighting as the predicted value of the pixel value of the current pixel.

With reference to any one of the first aspect and the first to the fourth implementations of the first aspect, in a seventh implementation of the first aspect, the determining a predicted value of a pixel value of the current pixel based on a pixel value of the target reference pixel and/or a pixel value of a neighboring pixel of the target reference pixel includes performing an interpolation operation at the location of the target reference pixel based on the pixel value of the neighboring pixel of the target reference pixel, and determining a pixel value obtained through the interpolation operation as the predicted value of the pixel value of the current pixel.

In some implementations, both the current image and the reference image are two-dimensional images.

In some implementations, determining, based on the layout information of the reference image and the location of the initial reference pixel, whether the initial reference pixel is located outside the second sub-image in the reference image includes determining whether the initial reference pixel is located outside the second sub-image in the reference image based on the location of the initial reference pixel and an area in which the second sub-image in the reference image is located, where the area in which the second sub-image in the reference image lies is determined based on the layout information of the reference image.

In some implementations, a polyhedron corresponding to the two-dimensional image is a regular polyhedron. The regular polyhedron may include a regular tetrahedron, a regular hexahedron, a regular octahedron, a regular dodecahedron, and a regular icosahedron.

In some implementations, when the initial reference pixel is located in the second sub-image at the location corresponding to the first sub-image in the reference image, the predicted value of the pixel value of the current pixel is determined based on a pixel value of the initial reference pixel.

When the initial reference pixel is located in the second sub-image, the pixel value of the current pixel can be predicted directly based on the pixel value of the initial reference pixel without searching for the target reference pixel based on the initial reference pixel. Only when the initial reference pixel is not located in the second sub-image (in this case, because a neighboring area of the sub-image in the two-dimensional image is distorted, the pixel value of the current pixel cannot be predicted directly based on the initial reference pixel), the target reference pixel may be searched for based on the location of the initial reference pixel.

According to a second aspect, a motion compensating prediction method is provided. The method includes determining a location of an initial reference pixel of a current pixel in a reference image, where the current pixel is located in a first sub-image in the current image, when the initial reference pixel is located outside a second sub-image at a location corresponding to the first sub-image in the reference image, determining a location of a target reference pixel of the current pixel in an expansion area of the second sub-image, where the expansion area of the second sub-image is located outside the second sub-image, the expansion area includes a plurality of pixels, a pixel value of any first pixel in the expansion area is determined based on a pixel value of a second pixel in the reference image, a line connecting a location of the second pixel in a surface of a polyhedron formed by the reference image and a location of the first pixel in a first plane passes through a center point of the polyhedron, the location of the second pixel in the face of the polyhedron is determined based on the location of the first pixel and layout information of the polyhedron corresponding to the reference image, the first plane is a plane in which a face corresponding to the second sub-image in the polyhedron lies, and location precision of the second pixel is limited to being less than or equal to preset pixel location precision, and determining a predicted value of a pixel value of the current pixel based on a pixel value of the target reference pixel and/or a pixel value of a neighboring pixel of the target reference pixel.

When the initial reference pixel is located outside the second sub-image, due to impact of geometric distortion of a sub-image boundary of a two-dimensional image, it is inaccurate to predict the current pixel directly based on the initial reference pixel. Therefore, in this case, in the present disclosure, the target reference pixel that can really provide a reference effect is directly found in the expansion area directly based on the current pixel and motion information of the current pixel, and then the pixel value of the current pixel is predicted based on the target reference pixel such that the target reference pixel can be rapidly found, and accuracy of motion compensating prediction can be further improved.

It should be understood that, the expansion area of the second sub-image may be determined based on the method according to the first aspect.

With reference to the second aspect, in a first implementation of the second aspect, the method further includes determining the location of the second pixel in the surface of the polyhedron based on the location of the first pixel and the layout information of the reference image, where the location of the second pixel in the surface of the polyhedron is an intersection point between the surface of the polyhedron and a line connecting the first pixel and the center point of the polyhedron, and determining a location of the second pixel in the reference image based on the location of the second pixel in the surface of the polyhedron and the layout information of the reference image.

With reference to the first implementation of the second aspect, in a second implementation of the second aspect, the method further includes determining, based on the layout information of the reference image and the location of the initial reference pixel, whether the initial reference pixel is located outside the second sub-image in the reference image.

According to a third aspect, a motion compensating prediction method is provided. The method includes determining a location of an initial reference pixel of a current pixel in a reference image, where the current pixel is located in a first sub-image in the current image, when the initial reference pixel is located outside a second sub-image at a location corresponding to the first sub-image in the reference image, determining, based on the location of the initial reference pixel, a location of a target reference pixel of the current pixel in a surface of a polyhedron corresponding to the reference image, where a line connecting the location of the target reference pixel in the surface of the polyhedron and a location of the initial reference pixel in a first plane passes through a center point of the polyhedron, and the first plane is a plane in which a face corresponding to the second sub-image in the polyhedron lies, determining a location of the target reference pixel in the reference image based on the location of the target reference pixel in the surface of the polyhedron, where location precision of the target reference pixel is limited to being less than or equal to preset pixel location precision, and determining a predicted value of a pixel value of the current pixel based on a pixel value of the target reference pixel and/or a pixel value of a neighboring pixel of the target reference pixel in the reference image.

When the initial reference pixel is located outside the second sub-image, due to impact of geometric distortion of a sub-image boundary of a two-dimensional image, it is inaccurate to predict the current pixel directly based on the initial reference pixel. Therefore, in this case, in the present disclosure, the target reference pixel that can really provide a reference effect is found based on the location of the initial reference pixel, and then the pixel value of the current pixel is predicted based on the target reference pixel, thereby improving accuracy of motion compensating prediction.

With reference to the third aspect, in a first implementation of the third aspect, the determining, based on the location of the initial reference pixel, a location of a target reference pixel of the current pixel in a surface of a polyhedron corresponding to the reference image includes determining the location of the initial reference pixel in the first plane based on the location of the initial reference pixel and layout information of the reference image, and determining the location of the target reference pixel in the surface of the polyhedron based on the location of the initial reference pixel in the first plane and the layout information of the reference image.

With reference to the third aspect or the first implementation of the third aspect, in a second implementation of the third aspect, the determining a location of the target reference pixel in the reference image based on the location of the target reference pixel in the surface of the polyhedron includes determining the location of the target reference pixel in the reference image based on the location of the initial reference pixel and the layout information of the reference image, where the location of the target reference pixel in the surface of the polyhedron is an intersection point between the surface of the polyhedron and a line connecting the initial reference pixel and the center point of the polyhedron.

According to a fourth aspect, a motion compensating prediction apparatus is provided. The motion compensating prediction apparatus includes modules configured to perform the method according to the first aspect.

According to a fifth aspect, a motion compensating prediction apparatus is provided. The motion compensating prediction apparatus includes modules configured to perform the method according to the second aspect.

According to a sixth aspect, a motion compensating prediction apparatus is provided. The motion compensating prediction apparatus includes modules configured to perform the method according to the third aspect.

According to a seventh aspect, a coder-decoder is provided. The coder-decoder includes a non-volatile storage medium and a central processing unit, the non-volatile storage medium stores an executable program, and the central processing unit is connected to the non-volatile storage medium and executes the executable program to implement the motion compensating prediction method according to the first aspect of the present disclosure and extended content thereof.

According to an eighth aspect, a coder-decoder is provided. The coder-decoder includes a non-volatile storage medium and a central processing unit, the non-volatile storage medium stores an executable program, and the central processing unit is connected to the non-volatile storage medium and executes the executable program to implement the motion compensating prediction method according to the second aspect of the present disclosure and extended content thereof.

According to a ninth aspect, a coder-decoder is provided. The coder-decoder includes a non-volatile storage medium and a central processing unit, the non-volatile storage medium stores an executable program, and the central processing unit is connected to the non-volatile storage medium and executes the executable program to implement the motion compensating prediction method according to the third aspect of the present disclosure and extended content thereof.

According to a tenth aspect, a computer-readable medium is provided. The computer-readable medium stores program code executed by an image processing device, and the program code includes an instruction used to perform the method according to the first aspect.

According to an eleventh aspect, a computer-readable medium is provided. The computer-readable medium stores program code executed by an image processing device, and the program code includes an instruction used to perform the method according to the second aspect.

According to a twelfth aspect, a computer-readable medium is provided. The computer-readable medium stores program code executed by an image processing device, and the program code includes an instruction used to perform the method according to the third aspect.

According to a thirteen aspect, a dedicate processor with massive integrate circuits with the functionality of performing the method according to the third aspect.

In the present disclosure, when the initial reference pixel is located outside the second sub-image, the target reference pixel that can really provide the reference effect is found based on the location of the initial reference pixel, and then the pixel value of the current pixel is predicted based on the target reference pixel, thereby improving the accuracy of the motion compensating prediction.

BRIEF DESCRIPTION OF DRAWINGS

To describe the technical solutions in the embodiments of the present disclosure more clearly, the following briefly introduces the accompanying drawings required for describing the embodiments of the present disclosure. The accompanying drawings in the following description show merely some embodiments of the present disclosure, and a person of ordinary skill in the art may derive other drawings from these accompanying drawings without creative efforts.

FIG. 5 is a schematic flowchart of a motion compensating prediction method according to an embodiment of the present disclosure.

FIG. 6A & FIG. 6B are schematic diagrams of a current image and a reference image.

FIG. 7A-FIG. 7F are schematic diagrams of reference images in different layout formats.

FIG. 14 is a schematic flowchart of a motion compensating prediction method according to an embodiment of the present disclosure.

FIG. 15A-FIG. 15D are schematic diagrams of an expansion area.

DESCRIPTION OF EMBODIMENTS

The following clearly describes the technical solutions in the embodiments of the present disclosure with reference to the accompanying drawings in the embodiments of the present disclosure. The described embodiments are some rather than all of the embodiments of the present disclosure. All other embodiments obtained by a person of ordinary skill in the art based on the embodiments of the present disclosure without creative efforts shall fall within the protection scope of the present disclosure.

To better understand a motion compensating prediction method in the embodiments of the present disclosure, a scenario to which the motion compensating prediction method in the embodiments of the present disclosure is applied is first briefly described with reference to FIG. 1 to FIG. 3.

To support video image content display in all directions, a virtual reality (VR) video image usually includes omnidirectional visual information at 360 degrees in top, bottom, left, and right directions in a three-dimensional space. The VR video image can be imaged as a map that is viewed in a direction from an internal central location of a globe to the globe. Typically, the VR video image is also referred to as a panoramic video image (which may be referred to as a spherical image for short).

The spherical image cannot be easily indicated, stored, or indexed. In an embodiment, before the spherical image is processed, the spherical image is usually unfolded to obtain a two-dimensional image, and then operations such as compression, processing, storage, and transmission are performed on the two-dimensional image. A process of unfolding a spherical image to obtain a two-dimensional image is referred to as projection.

Figure 1:
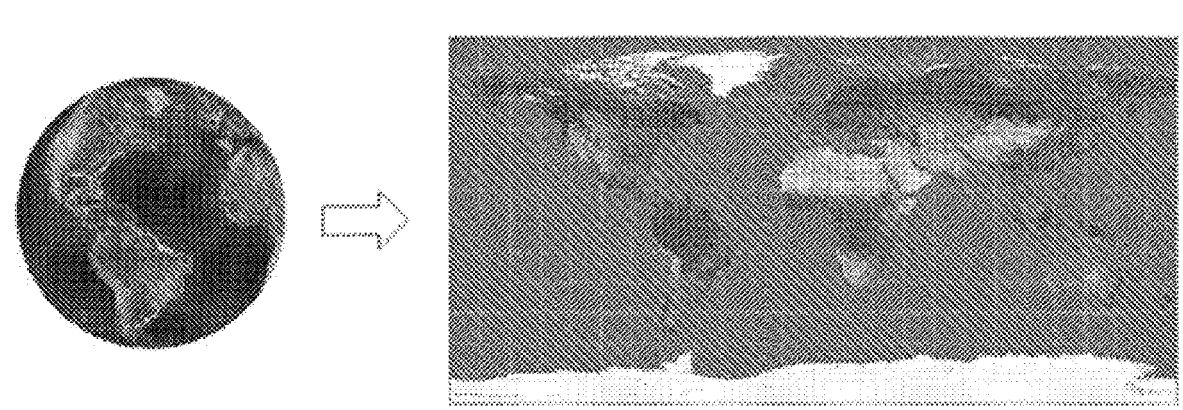
FIG. 1 is a geographic map of a spherical image.

As shown in FIG. 1, a most common two-dimensional image is referred to as a geographic map. In FIG. 1, images of regions adjacent to the north and south poles are relatively greatly stretched. Consequently, severely distortion and data redundancy exist.

To overcome the disadvantages existing in the geographic map, a spherical image may be projected to a regular polyhedron, to covert the spherical image into a two-dimensional image in a polyhedral format. As shown in FIG. 2, the spherical image may be projected to a regular tetrahedron (203), a regular hexahedron (206), a regular octahedron (209), a regular dodecahedron (212), and a regular icosahedron (215), and two-dimensional planar images obtained by projecting the spherical image to the foregoing polyhedrons are sequentially shown in 216-220 of FIG. 2.

A specific process of projecting a spherical image to a polyhedron is disposing the spherical image in the polyhedron, to make the spherical image an inscribed sphere of the polyhedron, drawing a line connecting a sphere center or a center of the polyhedron and a point in the sphere, and extending the connection line relative to the polyhedron such that a pixel at an intersection point in the polyhedron is a pixel of a corresponding point in the spherical image.

A process of projecting a spherical image to a regular hexahedron is used as an example below with reference to FIG. 3. A sphere is inscribed in a regular hexahedron ABCDEFGH. To obtain a pixel value at a point M' in the regular hexahedron, a line connecting a sphere center O and M' is drawn, and the connection line is intersected with the sphere at a point M. Therefore, a pixel at the point M is a pixel at the point M'. Similarly, all pixels in an area ABCD in a plane A' B' C' D' may be obtained according to the same method. The pixels in the area ABCD form a face ABCD, and the plane A' B' C' D' is a projection plane (projection plane) of the face ABCD.

Figures 4A, 4B:
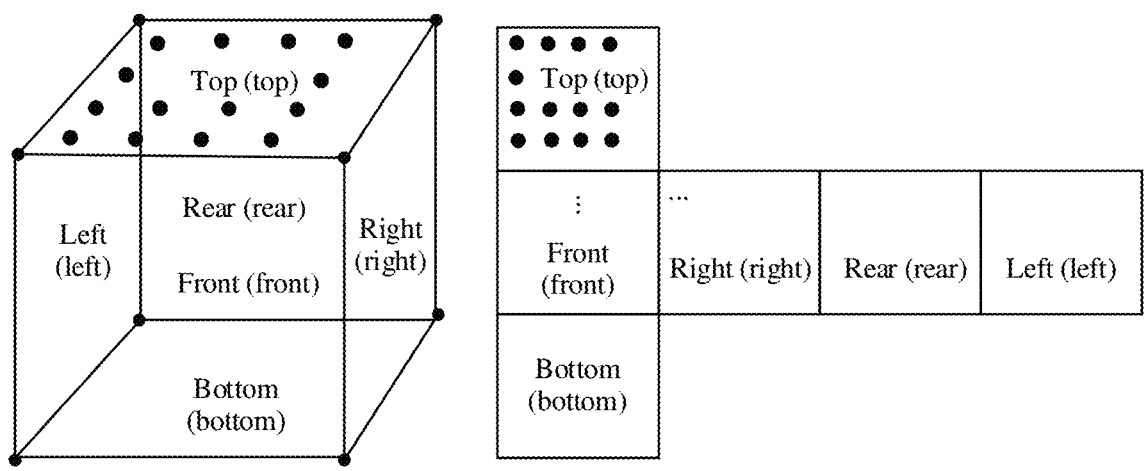
FIG. 4A & FIG. 4B are schematic diagrams of a two-dimensional image obtained by unfolding a regular hexahedron and a regular hexahedron.

After a spherical image is projected to a regular polyhedron, and then a surface of the polyhedron is unfolded to a two-dimensional image, each face image on the surface of the polyhedron becomes an image of an area in the two-dimensional image or a sub-image in the spherical image. For example, a surface of a regular hexahedron in FIG. 4A is unfolded to an image shown in FIG. 4, a face image of a top face on the surface of the hexahedron becomes a sub-image at the upper left corner in FIG. 4B. The sub-image is referred to as a face image of a top face in a spherical image, and the top face in the spherical image refers to an area covered by the face image of the top face. For any pixel in the top face, the top face is referred to as a face in which the pixel is located.

It should be understood that in this embodiment of the present disclosure, the face corresponds to the sub-image. For example, a bottom face is a face of a two-dimensional image, an image in the bottom face is a first sub-image, the bottom face is a face corresponding to the first sub-image, and the first sub-image is a sub-image corresponding to the bottom face. As shown in reference 220 of FIG. 2, each small rectangular region is a face of a two-dimensional image, and an image formed by pixels in each rectangular region is a sub-image in the two-dimensional image. In an embodiment, the face is a concept of an area, and the sub-image is an image.

Figure 2:
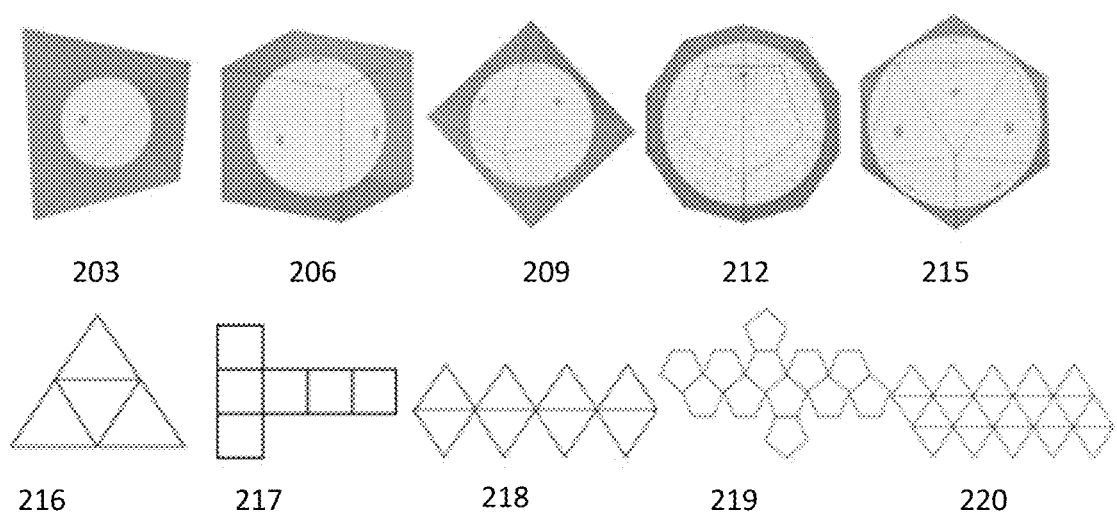
FIG. 2 is a two-dimensional image in a polyhedral format.
Figure 3:
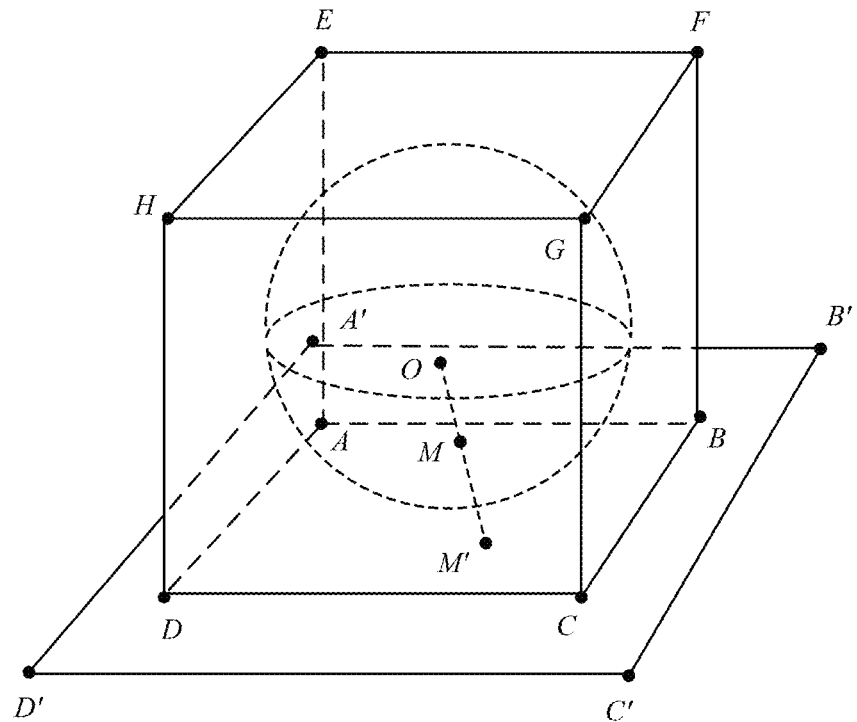
FIG. 3 is a schematic diagram in which a spherical image is projected to a regular hexahedron.

In addition, when an operation such as encoding and decoding or compression is performed on the two-dimensional image, each of the images shown in reference 216-220 of FIG. 2 may be directly processed. In an embodiment, an image in a rectangular region that has a smallest area and that encircles the image may be selected as a to-be-processed object. An area other than an area including a face of the two-dimensional image in the rectangular region may be filled with default content, for example, filled as all gray, all black, or all white.

It should be understood that, during encoding and decoding on the image, the image is usually divided into a plurality of image blocks having same sizes, and then, for each image block, a reference block is searched for. In a process of searching for a reference block for a current image block, different reference situations may exist which may be classified into unidirectional prediction and bidirectional prediction based on reference directions. The unidirectional prediction means that a current block has a reference image set (an element in the set is a reference image selected from one or more reconstructed images), and a code block may select any reference image from the set. The bidirectional prediction means that a current block has two reference image sets (elements in the two sets are respectively images independently selected from one or more reconstructed images, and reference images in the two sets may be partially or all the same), and a code block may select a reference image from each of the two sets. Whether the bidirectional prediction or the unidirectional prediction is used and a reference image set construction method are agreed upon by both an encoder side and a decoder side. Alternatively, the encoder side transmits a used method to the decoder side, and the decoder side determines a to-be-used method based on a decoding result. When the bidirectional prediction method is used, a current code block has two reference blocks, and each reference block requires a motion information indication. The decoder side may determine the two reference blocks based on two sets of motion information that are obtained through decoding. A predicted value of a pixel value of a pixel in the current block is determined based on pixel values of pixels in the two reference blocks.

Actually, determining the reference block of the current block, and predicting the current block based on the reference block is determining a reference pixel that is in the reference block and that is of the current pixel in the current block, and then predicting the predicted value of the pixel value of the current pixel based on a pixel value of the reference pixel. The motion compensating prediction method in the embodiments of the present disclosure is described below in detail.

FIG. 5 is a schematic flowchart of a motion compensating prediction method according to an embodiment of the present disclosure. The method includes the following steps.

110. Determine a location of an initial reference pixel of a current pixel in a reference pixel, where the current pixel is located in a first sub-image in a current image.

It should be understood that, both the current image and the reference image are two-dimensional images in a polyhedral format that are obtained by converting spherical images.

It should be understood that, when prediction processing is performed on the current image, the current image may be divided into a plurality of image blocks, and then each image block is processed. The current pixel may be a pixel in an image block in the current image. In an embodiment, the foregoing to-be-processed current pixel may be located in an image block in the first sub-image.

In an embodiment, in a decoder, the location of the initial reference pixel in the reference image may be determined based on a location of the current pixel and motion information of the current pixel that is obtained by decoding a motion information bitstream. For example, the reference image is determined based on reference image indication information in the motion information, and the location of the initial reference pixel in the reference image is determined based on motion vector information in the motion information and the location of the current pixel. In an encoder, in a motion search process, when a reference image is searched for a reference block for a current block, or when a reference pixel is searched for the current pixel, a location of a current reference pixel is the location of the initial reference pixel.

It is assumed that polyhedrons corresponding to the current image and the reference image are regular hexahedrons, FIG. 6A is the current image (the current pixel is in the current image), FIG. 6B is the reference image (the initial reference pixel is in the reference image), both the current image and the reference image have six sub-images, and the sixth sub-images are respectively top, front, right, rear, left, and bottom. The sub-image herein may be considered as an array including some pixels, and these pixels are in a same projection plane when a sphere is projected to the polyhedron. After the polyhedron is unfolded to a two-dimensional image, each face of the polyhedron becomes a part of the two-dimensional image. It is assumed that the current pixel is P, and P is in the bottom sub-image in the current image. It is assumed that the initial reference pixel is T, and T is in the front sub-image in the reference image, to be specific, T is not in the bottom sub-image in the reference image. It should be understood that, the first sub-image is the bottom sub-image in FIG. 6A, a second sub-image is the bottom sub-image in FIG. 6B, and the first sub-image and the second sub-image are sub-images at corresponding locations in the current image and the reference image.

120. When the initial reference pixel is located outside a second sub-image at a location corresponding to the first sub-image in the reference image, determine a location of a target reference pixel of the current pixel in the reference image based on the location of the initial reference pixel, where a line connecting a location of the target reference pixel in a surface of a polyhedron corresponding to the reference image and a location of the initial reference pixel in a first plane passes through a center point of the polyhedron, the location of the target reference pixel in the surface of the polyhedron is determined based on the location of the initial reference pixel and layout information of the polyhedron corresponding to the reference image, and the first plane is a plane in which a face corresponding to the second sub-image in the polyhedron lies.

It should be understood that, when the initial reference pixel is located in the second sub-image at the location corresponding to the first sub-image in the reference image, the current pixel may be predicted directly based on the initial reference pixel without searching for the target reference pixel.

The polyhedron corresponding to the reference image may be a polyhedron formed by the reference image, to be specific, a polyhedron formed by folding the sub-images in the reference image according to a rule.

Optionally, the method further includes determining, based on the layout information of the reference image and the location of the initial reference pixel, whether the initial reference pixel is located outside the second sub-image in the reference image.

When whether the initial reference pixel is located outside the second sub-image is determined, the location of the initial reference pixel in the reference image is determined first. When the location of the initial reference pixel is determined, for the decoder and the encoder, a specific determining process is as follows.

For the decoder, the location of the initial reference pixel in the reference image may be determined based on the location of the current pixel and the motion information of the current pixel that is obtained by decoding the motion information bitstream. For example, the decoder may determine the reference image based on the reference image indication information in the motion information, and determine the location of the initial reference pixel in the reference image based on the motion vector information in the motion information and the location of the current pixel.

For the encoder, when the reference block is searched for the current block, or the reference pixel is searched for the current pixel, the location of the current reference pixel is the location of the initial reference pixel.

Optionally, the layout information of the polyhedron corresponding to the reference image includes at least one of face quantity information of the polyhedron corresponding to the reference image, sub-image arrangement manner information of the reference image, sub-image arrangement order information of the reference image, and sub-image rotation information of the reference image.

In an embodiment, the face quantity information of the polyhedron corresponding to the reference image may be a type of the polyhedron corresponding to the reference image. In an embodiment, the face quantity information of the polyhedron may indicate that the reference image corresponds to a regular hexahedron.

The sub-image arrangement manner information of the reference image is an arrangement manner of the sub-images in the reference image. As shown in FIG. 7A-F, the reference image corresponds to a regular hexahedron such that the reference image includes six sub-images, and arrangement of the six sub-images may be a 4×3 type (FIG. 7B), a 3×2 type (FIG. 7C and FIG. 7D), or a 6×1 type (FIG. 7E and FIG. 7F).

The sub-image arrangement order information of the reference image is an arrangement order of the sub-images in the reference image. For example, FIG. 7C and FIG. 7D are 3×2-type images. In FIG. 7C, sub-images corresponding to a front face are arranged at the lower left corner. However, in FIG. 7D, sub-images corresponding to a front face are arranged at the middle of a first column.

The sub-image rotation information of the reference image may be a rotation angle of the sub-image in the reference image. Assuming that a disposition location of each sub-image in FIG. 7C is used as a reference, in FIG. 7D, a rotation angle of the sub-image corresponding to the front face is −90 degrees.

In the foregoing step, the location of the target reference pixel in the surface of the polyhedron corresponding to the reference image is determined. In this case, the determined pixel location is obtained through calculation based on a formula, and precision of the pixel location is relatively high. Relatively high pixel location precision increases complexity of a subsequent interpolation operation. To reduce the complexity of the subsequent interpolation operation, the precision of the location of the target reference pixel in the surface of the polyhedron corresponding to the reference image is limited.

Optionally, in a process of determining the location of the target reference pixel corresponding to the current pixel, the location precision of the target reference pixel and location precision of the surface of the polyhedron corresponding to the target reference pixel are relatively high. To reduce complexity of an encoding and decoding system and improve an operation speed, the location precision of the target reference pixel and/or the location precision of the surface of the polyhedron corresponding to the target reference pixel (which is referred to as location precision for short below) in the foregoing step may be limited. A specific location precision threshold, to be specific, allowed highest location precision may be agreed upon by both an encoder side and a decoder side. For example, the precision threshold is limited to 1/16 pixel precision, or 1/8 pixel precision, or other pixel precision. Using $1/2^N$ pixel precision as an example, if the location of the target reference pixel in the surface of the polyhedron corresponding to the reference image that is obtained through calculation is $(x_f, y_f)$ and a location obtained through precision limitation is $(x_b, y_b)$ and $y_b$ may be obtained by using the following formula:

$$x_b = \text{round}\left(\left(x_f + \frac{1}{2^{N+1}}\right)/\frac{1}{2^N}\right), \text{ and}$$

$$y_b = \text{round}\left(\left(y_f + \frac{1}{2^{N+1}}\right)/\frac{1}{2^N}\right),$$

where round indicates a rounding operation, and $(x_b, y_b)$ is the location of the target reference pixel in the surface of the polyhedron corresponding to the reference image that is expressed in an integral form based on the $1/2^N$ pixel precision. If the integral form is converted into a representation form having a decimal, the location of the target reference pixel in the surface of the polyhedron corresponding to the reference image is expressed as:

$(x_c, y_c) = (x_b/2^N, y_b/2^N)$.

After the foregoing precision limitation operation, the location precision of the target reference pixel may be limited to being less than or equal to a preset pixel precision value.

130. Determine a predicted value of a pixel value of the current pixel based on a pixel value of the target reference pixel and/or a pixel value of a neighboring pixel of the target reference pixel.

In this embodiment of the present disclosure, when the initial reference pixel is located outside the second sub-image, the target reference pixel that can really provide a reference effect is found based on the location of the initial reference pixel, and then the pixel value of the current pixel is predicted based on the target reference pixel, thereby improving accuracy of motion compensating prediction.

Optionally, in an embodiment, the determining a location of a target reference pixel of the current pixel in the reference image based on the location of the initial reference pixel includes determining the location of the target reference pixel in the surface of the polyhedron based on the location of the initial reference pixel and the layout information of the reference image, where the location of the target reference pixel in the surface of the polyhedron is an intersection point between the surface of the polyhedron and a line connecting the initial reference pixel and the center point of the polyhedron, and determining the location of the target reference pixel in the reference image based on the location of the target reference pixel in the surface of the polyhedron and the layout information of the reference image. The location precision of the target reference pixel is limited to being less than or equal to preset pixel location precision.

The determining the location of the target reference pixel in the surface of the polyhedron based on the location of the initial reference pixel and the layout information of the reference image is described below in detail with reference to an example 1 and an example 2.

Example 1

Figures 8A, 8B, 9:
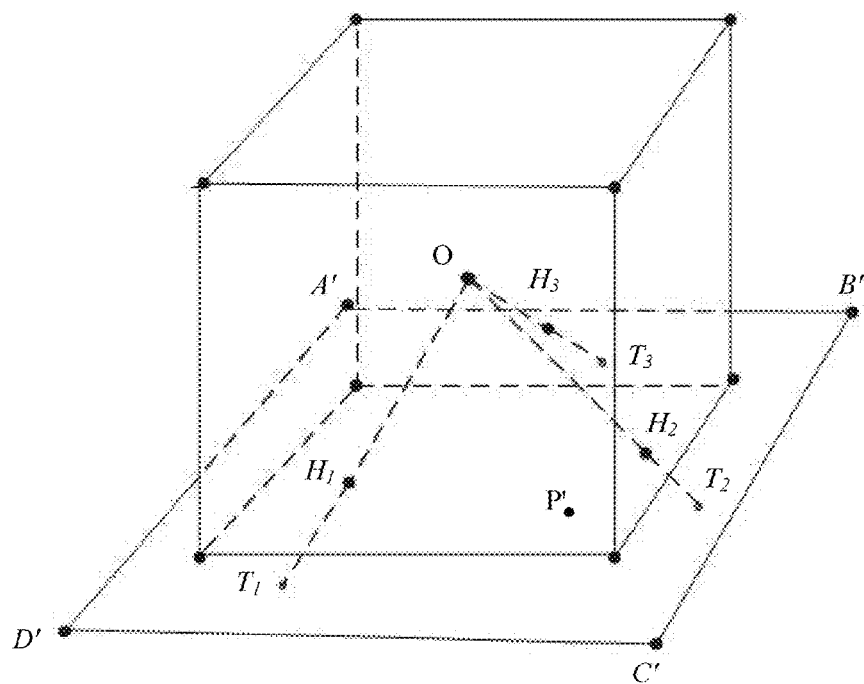
FIG. 8A & FIG. 8B are schematic diagrams of a current image and a reference image.
FIG. 9 is a schematic diagram of a regular hexahedron corresponding to a reference image.

In FIG. 8-B, FIG. 8A is the current image, FIG. 8B is the reference image, P is the current pixel in the current image and P is located in a bottom face in the current image, P' is a pixel having a same location as P in the reference image and P' is located in a bottom face in the reference image, and $T_1$, $T_2$, and $T_3$ are all initial reference pixels of the current pixel and all of $T_1$, $T_2$, and $T_3$ are located outside the bottom face in the reference image.

A regular hexahedron in FIG. 9 is a polyhedron corresponding to the reference image that is constructed by using the bottom face in the reference image as a base plane. FIG. 9 shows three current reference pixels $T_1$, $T_2$, and $T_3$ in FIG. 8B. It can be learned from FIG. 9 that, corresponding pixels of three target reference pixels in the regular hexahedron are respectively $H_1$, $H_2$ and $H_3$. $H_1$, $H_2$ and $H_3$ are respectively located at intersection points between the regular hexahedron and lines connecting a point O and $T_1$, $T_2$, and $T_3$. In this way, locations of $H_1$, $H_2$ and $H_3$ may be determined based on locations of $T_1$, $T_2$, and $T_3$. It should be understood that, in FIG. 9, $T_1$, $T_2$, and $T_3$ are only cases in which the initial reference pixel is located at different locations. Actually, only one reference pixel exists at a same time.

How to determine the location of the corresponding pixel of the target reference pixel in the polyhedron based on the location of the initial reference pixel is described below in detail by using FIG. 10 as an example.

In an embodiment, using $T_1$ as an example, determining, based on the location of $T_1$, a location of a projected pixel that is in a surface of a polyhedron and to which the target reference pixel is projected is described in detail.

Figure 10:
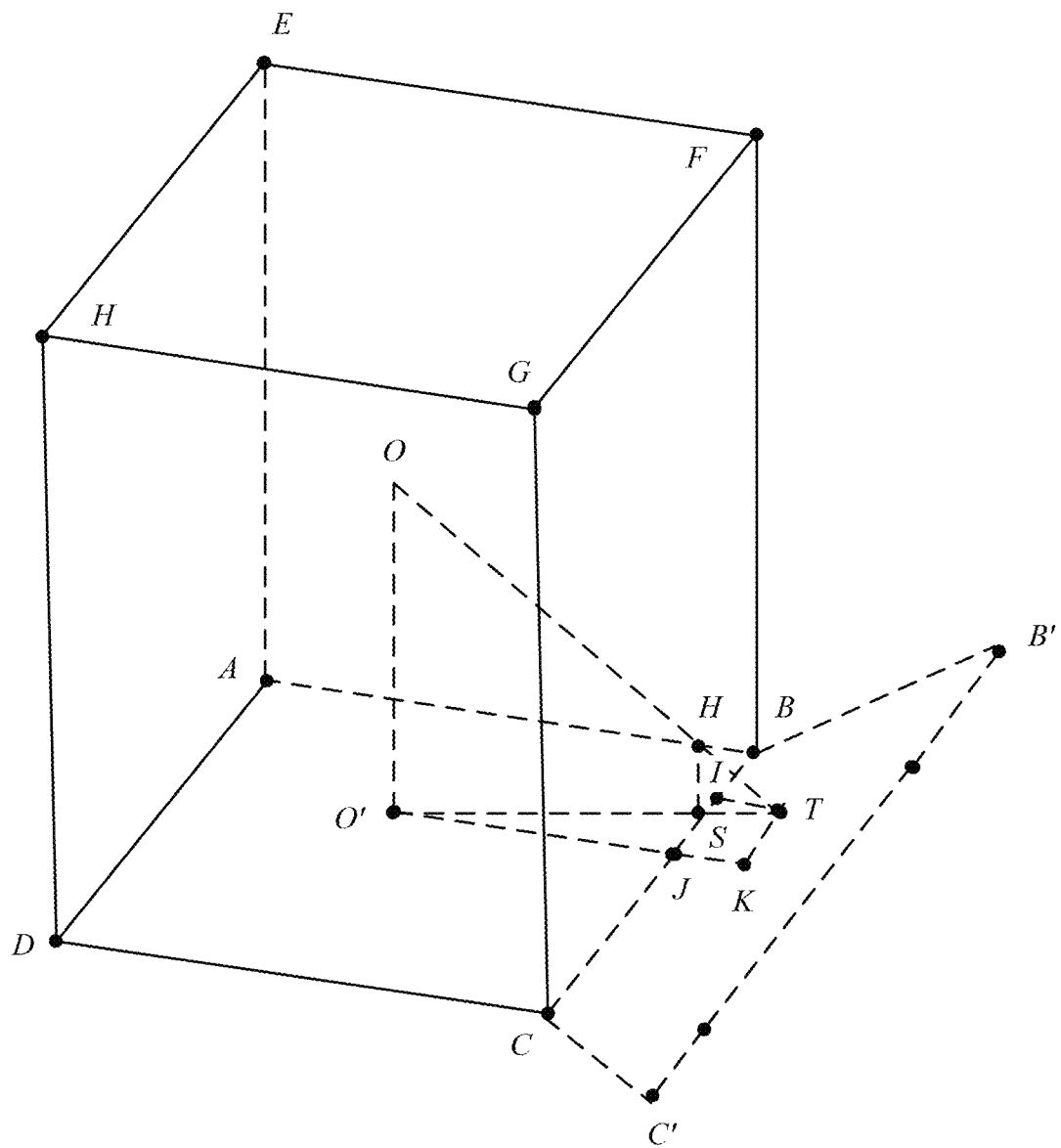
FIG. 10 is a schematic diagram of a regular hexahedron corresponding to a reference image.

A regular hexahedron in FIG. 10 is a polyhedron corresponding to the reference image that is constructed by using the bottom face in the reference image as a base plane. To be specific, an anchor face of the regular hexahedron (where the anchor face may be understood as the base plane for constructing the polyhedron, for example, if a face in the reference image is used as a base plane for constructing a polyhedron, the base plane is an anchor face of the polyhedron) is the bottom face in the reference image. An edge length of the regular hexahedron is a, O is a center of the regular hexahedron, a location of T is the location of the initial reference pixel, a face ABCD is a face in which a pixel having a same location as the current pixel is located in the reference image, O' is a vertical projection of O that is projected from a projection plane in which the face ABCD in which the projection of the current pixel is located lies to the face ABCD along a face normal line direction, J is a midpoint of a side BC, K is a vertical projection of T on an extension line of O'J, OT and a face BCGF are intersected at a point H (a location of the point H is a location of a projected pixel of the initial reference pixel), a vertical projection of the point H on the side BC is S, and I is a vertical projection of T on the side BC. The edge length of the regular hexahedron is a. Therefore, both lengths of OO' and O'J are $$\frac{a}{2}.$$

Assuming that a length of a line segment JK is x, and a length of a line segment KT is y, it may be obtained based on similar triangles that:

$$L_{SJ} = \frac{a/2 * y}{a/2 + x}, \text{ and} \tag{1}$$

$$L_{SH} = \frac{a/2 * \sqrt{x^2 + \left(\frac{xy}{a/2+x}\right)^2}}{\sqrt{(x+a/2)^2 + y^2}}, \tag{2}$$

where $L_{SJ}$ is a length of SJ, and $L_{SH}$ is a length of SH. After the length of SJ and the length of SH are obtained based on the formula (1) and the formula (2), a location of the point H in a surface of the regular hexahedron may be determined. It should be understood that, the length of SJ and the length of SH may be determined based on location coordinates of the initial reference pixel, to obtain the location of the point H in the surface of the regular hexahedron. The formula (2) may be simplified to the following form based on a relationship of the similar triangles:

$$L_{SH} = \frac{a/2 * x}{a/2 + x}. \tag{2a}$$

The formula 2(a) may alternatively be obtained based on a geometrical relationship of the similar triangles shown in FIG. 10. A specific process is as follows:
in a triangle OO' T, $$\frac{L_{SH}}{L_{OO'}} = \frac{L_{ST}}{L_{O'T}}, \quad (a)$$

in a triangle O' KT, $$\frac{L_{ST}}{L_{O'T}} = \frac{L_{JK}}{L_{O'K}}, \quad (b)$$

and
obtaining $$\frac{L_{ST}}{L_{O'T}} = \frac{L_{JK}}{L_{O'K}} \quad (c)$$

by combining the foregoing formulas (a) and (b), where the length of OO' is $$\frac{a}{2},$$

the length of JK is x, and a length of O'K is $$\frac{a}{2} + x$$

such that the formula (2a) may be obtained by substituting the values into the formula (c).

Example 2

Figure 11A:
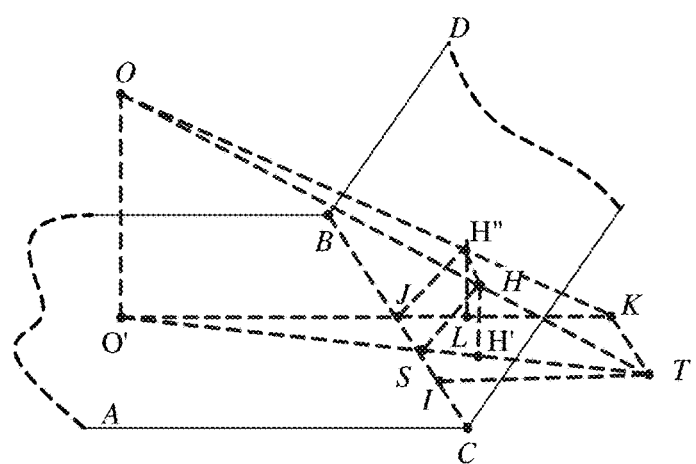
FIG. 11A & FIG. 11B are schematic diagrams of another polyhedron corresponding to a reference image.
Figure 11B:
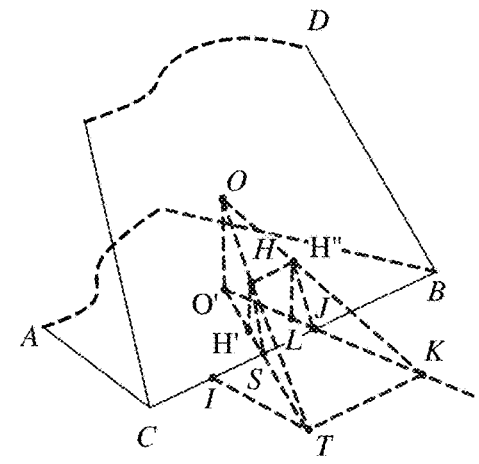

As shown in FIGS. 11A-B, a polyhedron corresponding to the reference image includes two faces ACB and DBC (the polyhedron may further include other faces, which are not listed herein one by one). The face ACB is a face in which a pixel having a same location as the current pixel is located in the reference image, O is a center of the polyhedron, O' is a vertical projection of O in the face ABC, a location of T is the location of the initial reference pixel, O'T and a side BC are intersected at a point S, OT and the face BCD are intersected at a point H, H" is a vertical projection of H on OK, L is a vertical projection of H" on OK, and I is a vertical projection of T on the side BC.

As shown in FIG. 11A, it is already known that a length of OO' is $L_{OO'}$, a length of O'J is $L_{O'J}$, a length of JK is $L_{JK}$, a length of KT is $L_{KT}$, an angle between the face ACB and the face BCD is α (α is greater than 90°), and ∠O'SH=θ such that the following formulas can be obtained:

$$L_{O'K} = L_{O'J} + L_{JK}, \quad (3)$$

$$L_{SJ} = \frac{L_{O'J} * L_{KT}}{L_{O'K}}, \quad (4)$$

$$L_{O'T} = \sqrt{L_{O'K}^2 + L_{KT}^2}, \quad (5)$$

$$L_{OT} = \sqrt{L_{O'O}^2 + L_{O'K} + L_{KT}^2}, \quad (6)$$

$$L_{ST} = \frac{L_{JK}}{L_{O'K}} * L_{O'T}, \quad (7)$$

$$L_{O'S} = \frac{L_{O'J}}{L_{O'K}} * L_{O'T}, \quad (8)$$

$$L_{SH'} = \frac{L_{OO'} * L_{ST}}{L_{O'T} * \tan(\pi - \theta) + L_{OO'}}, \quad (9)$$

$$L_{O'H'} = L_{O'S} + L_{SH'}, \quad (10)$$

$$L_{HH'} = \frac{L_{O'H'} * L_{KT}}{L_{O'T}}, \quad (11)$$

$$L_{H''L} = \frac{L_{H'T} * L_{OO'}}{L_{O'T}}, \text{ and} \quad (12)$$

$$L_{H''J} = \frac{L_{H''L}}{\sin(\pi - \alpha)}. \quad (13)$$

When the angle of the adjacent faces of the polyhedron is greater than 90°, $$L_{SJ} = \frac{L_{O'J} * L_{KT}}{L_{O'K}} \text{ and } L_{H''J} = \frac{L_{H''L}}{\sin(\pi - \alpha)}$$

may be finally obtained based on the formula (4) and the formula (13), to obtain $L_{SJ}$ and $L_{H''J}$ such that a location of projection of the target reference pixel in a surface of the polyhedron can be further determined.

In FIG. 11B, if the angle α between the face ACB and the face BCD is less than 90°, $$L_{SH'} = \frac{L_{OO'} * L_{ST}}{L_{O'T} * \tan(\theta) - L_{OO'}}, \quad (14)$$

$$L_{O'H'} = L_{O'S} - L_{SH'}, \quad (15)$$

$$L_{HH'} = \frac{L_{O'H'} * L_{KT}}{L_{O'T}}, \quad (16)$$

$$L_{H''L} = \frac{L_{H'T} * L_{OO'}}{L_{O'T}}, \text{ and} \quad (17)$$

$$L_{H''J} = \frac{L_{H''L}}{\sin(\alpha)}. \quad (18)$$

When the angle of the adjacent faces of the polyhedron is less than 90°, $$L_{SJ} = \frac{L_{O'J} * L_{KT}}{L_{O'K}} \text{ and } L_{H''J} = \frac{L_{H''L}}{\sin(\alpha)}$$

may be finally obtained based on the formulas (4) and (18), to obtain $L_{SJ}$ and $L_{H''J}$ such that a location of projection of the target reference pixel in a surface of the polyhedron can be further determined.

In a common regular polyhedron, an angle between adjacent faces of a tetrahedron is less than 90°, an angle between adjacent faces of a regular hexahedron is 90°, and an angle between adjacent faces of a regular octahedron or a more complex polyhedron is greater than 90°. For an image in another polyhedral format, corresponding parameters may be obtained according to a similar method, to finally obtain $L_{SJ}$ and $L_{H''j}$ such that a location of a projected pixel that is in a surface of a polyhedron and to which the target reference pixel is projected is further determined. It should be understood that, the location of the projected pixel refers to an intersection point between the surface of the polyhedron and a line connecting the initial reference pixel and a center of the polyhedron.

Optionally, in an embodiment, the determining the location of the target reference pixel in the surface of the polyhedron based on the location of the initial reference pixel and the layout information of the reference image includes determining the location of the initial reference pixel in the first plane based on the location of the initial reference pixel and the layout information of the reference image, and determining the location of the target reference pixel in the surface of the polyhedron based on the location of the initial reference pixel in the first plane and the layout information of the reference image.

Optionally, a point of the target reference pixel in the surface of the polyhedron may be understood as the projected pixel of the target reference pixel such that the determining a location of a target reference pixel of the current pixel in the reference image based on the location of the initial reference pixel includes determining a location of a projected pixel of the initial reference pixel in the surface of the polyhedron based on the location of the initial reference pixel and the layout information of the reference image, where the location of the projected pixel in the surface of the polyhedron is an intersection point between the surface of the polyhedron and a line connecting the initial reference pixel and the center point of the polyhedron, and determining the location of the target reference pixel in the reference image based on the location of the projected pixel in the surface of the polyhedron and the layout information of the reference image.

Figure 12A:
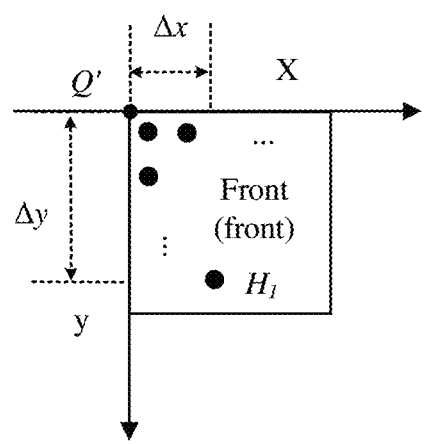
FIG. 12A-FIG. 12C show reference images in different layout formats.

How to determine the location of the target reference pixel in the reference image is described below by using a two-dimensional image in a regular hexahedron format as an example with reference to FIG. 12A-C. As shown in FIG. 12A, it is assumed that a side length of a regular hexahedron corresponding to the reference image is a, a layout format of the reference image is 4×3, a point that is in a front face of the regular hexahedron and to which the target reference pixel of the current pixel is projected is a point $H_1$, and distances between $H_1$ to a vertex at the upper left corner in the front face are respectively $\Delta x$ and $\Delta y$. The location of the target reference pixel in the reference image in two-dimensional images in different layout formats are determined below.

Figure 12B:
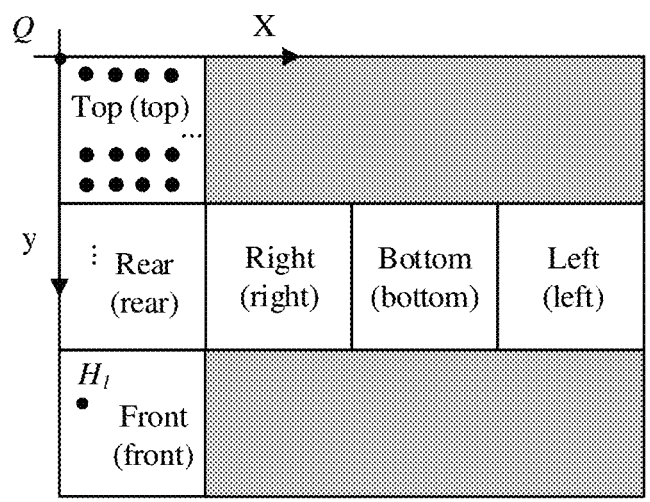

In FIG. 12B, an image has a width of 4a and has a height of 3a, a front face is located at the lower left corner and is not rotated. Therefore, a location of $H_1$ in the reference image relative to a vertex Q at the upper left corner of the reference image is ($\Delta x$, a+$\Delta y$).

Figure 12C:
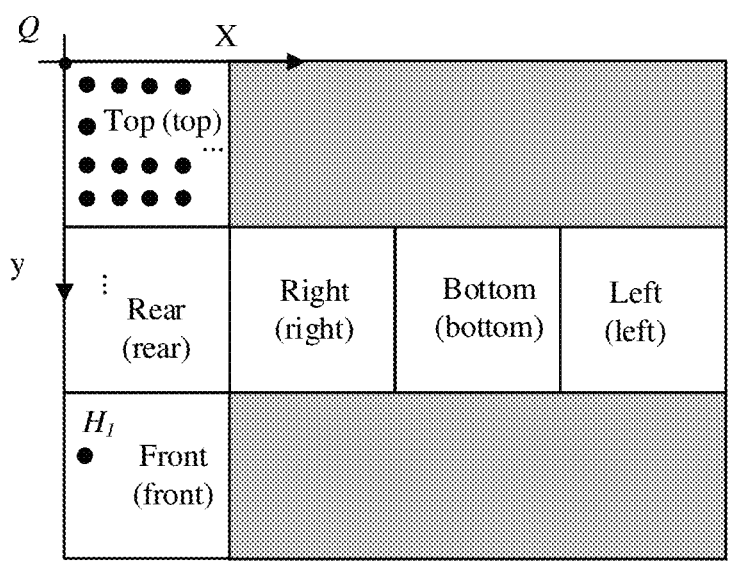

In FIG. 12C, a location of a front face is still the lower left corner that is the same as that of the front face in FIG. 12B, but is rotated 90 degrees in a clockwise direction. Therefore, a location of $H_1$ in the reference image relative to a vertex Q at the upper left corner of the reference image is (a−$\Delta y$, 2a+$\Delta x$).

Optionally, in an embodiment, the determining a predicted value of a pixel value of the current pixel based on a pixel value of the target reference pixel and/or a pixel value of a neighboring pixel of the target reference pixel includes determining the pixel value of the target reference pixel as the predicted value of the pixel value of the current pixel.

The pixel value of the target reference pixel may be a pixel value at the location of the target reference pixel. The pixel value of the target reference pixel is directly determined as the predicted value of the current pixel, thereby reducing a calculation procedure.

Optionally, in an embodiment, the determining a predicted value of a pixel value of the current pixel based on a pixel value of the target reference pixel and/or a pixel value of a neighboring pixel of the target reference pixel includes weighting the pixel value of the target reference pixel and the pixel value of the neighboring pixel of the target reference pixel, and determining a pixel value that is at the location of the target reference pixel and that is obtained through the weighting as the predicted value of the pixel value of the current pixel.

The foregoing weighting may be performing smooth filtering processing on the target reference pixel and the neighboring pixel, to be specific, averaging pixel values of a plurality of pixels including the target reference pixel. An obtained average value of the pixel values is used as the predicted value of the pixel value of the current pixel.

When the pixel value of the current pixel is predicted, the pixel value of the target reference pixel may be directly used as the predicted value of the pixel value of the current pixel. Alternatively, the pixel value of the current pixel is predicted based on both the target reference pixel and the neighboring pixel around the target reference pixel instead of merely using the pixel value of the current pixel.

Optionally, in an embodiment, the determining a predicted value of a pixel value of the current pixel based on a pixel value of the target reference pixel and/or a pixel value of a neighboring pixel of the target reference pixel includes performing an interpolation operation at the location of the target reference pixel based on the pixel value of the neighboring pixel of the target reference pixel, and determining a pixel value obtained through the interpolation operation as the predicted value of the pixel value of the current pixel.

After the location of the target reference pixel is determined, if there is no pixel value at the location, the interpolation operation may be performed at the location of the target reference pixel.

Figure 13:
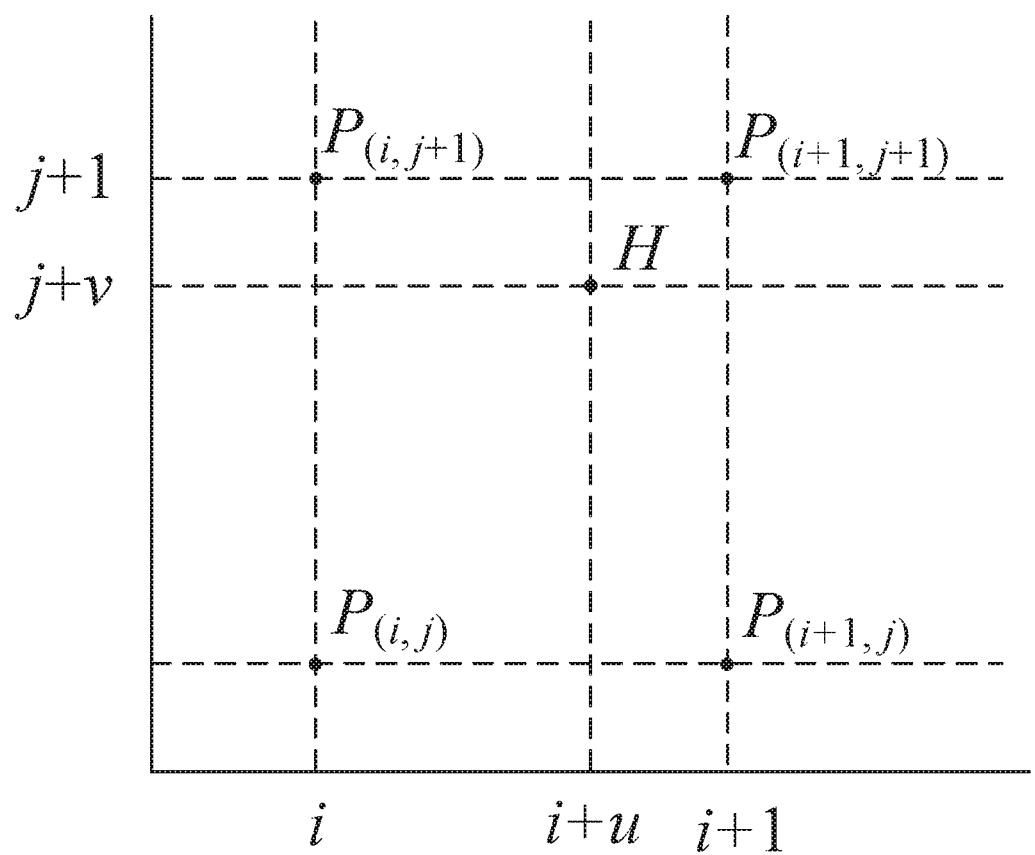
FIG. 13 is a schematic diagram of neighboring pixels around a target reference pixel.

In an embodiment, as shown in FIG. 13, coordinates of a projected point H are (i+u, j+v), where i and j are nonnegative integer, and both u and v are decimals within an interval [0, 1). Location coordinates of neighboring four integral pixels round H are respectively $P_{(i,j)}$, $P_{(i,j+1)}$, $P_{(i,j+1)}$, and $P_{(i+1,j+1)}$.

If a bi-linear interpolation algorithm is used, a pixel value at H may be obtained:

$$P_H = P_{(i,j)}(1-u)(1-v) + P_{(i,j+1)}(u)(1-v) + P_{(i,j+1)}(1-u)(v) + P_{(i+1,j+1)}(u)(v) \qquad (19)$$

However, if a bicubic interpolation algorithm is used, coordinates of the projected point H are still (i+u, j+v), and 16 neighboring points around the point H are respectively $P_{(i-1,j-1)}$, $P_{(i-1,j+0)}$, $P_{(i-1,j+1)}$, $P_{(i-1,j+2)}$, $P_{(i+0,j-1)}$, $P_{(i+0,j+0)}$, $P_{(i+0,j+1)}$, $P_{(i+0,j+2)}$, $P_{(i+1,j-1)}$, $P_{(i+1,j+0)}$, $P_{(i+1,j+1)}$, $P_{(i+1,j+2)}$, $P_{(i+2,j-1)}$, $P_{(i+2,j+0)}$, $P_{(i+2,j+1)}$, and $P_{(i+2,j+2)}$.

According to the bicubic interpolation algorithm, a pixel value at H is obtained:

$$P_H = [A] * [B] * [C], \qquad (20)$$

-continued $$[A] = [S(u+1)\ S(u+0)\ S(u-1)\ S(u-2)], \quad (21)$$

$$[B] = \begin{bmatrix} P_{(i-1,j-1)} & P_{(i-1,j+0)} & P_{(i-1,j+1)} & P_{(i-1,j+2)} \\ P_{(i+0,j-1)} & P_{(i+0,j+0)} & P_{(i+0,j+1)} & P_{(i+0,j+2)} \\ P_{(i+1,j-1)} & P_{(i+1,j+0)} & P_{(i+1,j+1)} & P_{(i+1,j+2)} \\ P_{(i+2,j-1)} & P_{(i+2,j+0)} & P_{(i+2,j+1)} & P_{(i+2,j+2)} \end{bmatrix}, \quad (22)$$

$$[C] = \begin{bmatrix} S(v+1) \\ S(v+0) \\ S(v-1) \\ S(v-2) \end{bmatrix}, \text{ and} \quad (23)$$

$$S(x) = \begin{cases} 1 - 2|x|^2 + |x|^3, & |x| \le 1 \\ 4 - 8|x| + 5|x|^2 - |x|^3, & 1 < |x| < 2 \\ 0, & |x| > 2 \end{cases} \quad (24)$$

How to determine, by using an interpolation algorithm, a pixel value at a location of a projected pixel in this embodiment of the present disclosure is described above in detail by merely using the bi-linear interpolation algorithm and the bicubic interpolation algorithm as examples. Actually, a Lanczos interpolation algorithm, a nearest neighbor interpolation algorithm, some non-analytic interpolation methods based on information such as an image structure, and the like may alternatively be used.

It should be understood that, after the pixel value of the target reference pixel is determined, the pixel value of the target reference pixel may be directly determined as the pixel value of the current pixel without considering whether the pixel value of the target reference pixel satisfies a corresponding requirement. In addition, alternatively, after the pixel value of the target reference pixel is determined, whether the pixel value of the target reference pixel satisfies a preset requirement is determined first. When the pixel value of the target reference pixel does not satisfy the requirement, the interpolation operation is performed on the target reference pixel based on the pixel value of the neighboring pixel of the target reference pixel, and the obtained pixel value is used as the predicted value of the pixel value of the current pixel. Alternatively, the weighting may be performed on the pixel value of the target reference pixel and the pixel value of the neighboring pixel of the target reference pixel, and a result obtained through the weighting is used as the predicted value of the pixel value of the current pixel.

FIG. 14 is a schematic flowchart of a motion compensating prediction method according to an embodiment of the present disclosure. The method shown in FIG. 14 includes the following steps.

210: Determine a location of an initial reference pixel of a current pixel in a reference pixel, where the current pixel is located in a first sub-image in a current image.

220: When the initial reference pixel is located outside a second sub-image at a location corresponding to the first sub-image in the reference image, determine a location of a target reference pixel of the current pixel in an expansion area of the second sub-image, where the expansion area of the second sub-image is located outside the second sub-image, the expansion area includes a plurality of pixels, a pixel value of any first pixel in the expansion area is determined based on a pixel value of a second pixel in the reference image, a line connecting a location of the second pixel in a surface of a polyhedron formed by the reference image and a location of the first pixel in a first plane passes through a center point of the polyhedron, the location of the second pixel in the face of the polyhedron is determined based on the location of the first pixel and layout information of the polyhedron corresponding to the reference image, the first plane is a plane in which a face corresponding to the second sub-image in the polyhedron lies, and location precision of the second pixel is limited to being less than or equal to preset pixel location precision.

230: Determine a predicted value of a pixel value of the current pixel based on a pixel value of the target reference pixel and/or a pixel value of a neighboring pixel of the target reference pixel.

In this embodiment of the present disclosure, when the initial reference pixel is located outside the second sub-image, the target reference pixel that can really provide a reference effect is directly found in the expansion area directly based on the current pixel and motion information of the current pixel, and then the pixel value of the current pixel is predicted based on the target reference pixel such that the target reference pixel can be rapidly found, and accuracy of motion compensating prediction estimation can be further improved.

It should be understood that, the pixel value of the pixel in the expansion area may be calculated according to the method shown in FIG. 5 in the foregoing descriptions. In this way, when the pixel value of the current pixel is predicted, the target reference pixel can be directly found in the expansion area, thereby rapidly predicting the pixel value of the current pixel.

Optionally, in an embodiment, the method shown in FIG. 14 further includes determining the location of the second pixel in the surface of the polyhedron based on the location of the first pixel and the layout information of the reference image, where the location of the second pixel in the surface of the polyhedron is an intersection point between the surface of the polyhedron and a line connecting the first pixel and the center point of the polyhedron, and determining a location of the second pixel in the reference image based on the location of the second pixel in the surface of the polyhedron and the layout information of the reference image. The location precision of the second pixel is limited to being less than or equal to the preset pixel location precision.

Optionally, in an embodiment, the method shown in FIG. 14 further includes the following.

In an embodiment, the motion compensating prediction method shown in FIG. 14 is that an expansion area of a sub-image in the reference image is determined first, and then a location of a reference pixel in the expansion area is determined. In this way, when the current pixel is predicted, the reference pixel can be directly found in the expansion area, and the current pixel can be predicted based on a pixel value of the reference pixel. The foregoing process is described below in detail with reference to FIG. 15, and specific steps are as follows.

201: Construct, in the reference image, the expansion area for a face at a location corresponding to the current pixel.

A face in which the current pixel is located is determined based on the layout information of the polyhedron corresponding to the reference image (usually, the layout information of the polyhedron corresponding to the reference image is the same as that corresponding to the current image such that the layout information of the polyhedron corresponding to the reference image may be used to determine the face in which a pixel in the current image is located) and a location of the current pixel such that the face corresponding to the current pixel in the reference image is found, the expansion area is constructed for the corresponding face, and a pixel value of a pixel in the expansion area is determined. A specific effect of the expansion area is similar to extending or filling a face around the face. As shown in FIG. 15A, the current pixel P is located in a bottom face such that an expansion area then may be constructed for the bottom face in the reference image. A range of the expansion area is shown by a dashed line area outside the bottom face in FIG. 15B. When a pixel value of a pixel in the expansion area is calculated, a polyhedron corresponding to the reference image shown in FIG. 15C may be constructed by using the bottom face in the reference image as a base plane. If the polyhedron is unfolded, locations of a rear face, a front face, a left face, a right face, and the like of the polyhedron that respectively fall in the expansion area are shown in FIG. 15D. For any first pixel in the expansion area, according to the motion compensating prediction method in the embodiment of the present disclosure shown in FIG. 5 in the foregoing descriptions, the location of the second pixel that corresponds to the first pixel and that is in the reference image may be finally determined based on the location of the first pixel, the face in which the current pixel corresponding to the first pixel is located, and the layout information of the polyhedron corresponding to the reference image, a pixel value at the location of the second pixel is determined, and finally, the pixel value at the location of the second pixel is used as a pixel value of the first pixel. Herein, the first pixel is similar to the initial reference pixel in the motion compensating prediction method in the embodiment of the present disclosure shown in FIG. 5, and the second pixel is similar to the target reference pixel in the motion compensating prediction method in the embodiment of the present disclosure shown in FIG. 5.

202: Determine a location of a target reference pixel of the current pixel in the expansion area.

The reference pixel of the current pixel is determined first, and whether the reference pixel is located in a face having a same location as the face in which the current pixel is located is determined based on the face in which the current pixel is located and the location of the reference pixel. If yes, the pixel value at the location of the reference pixel may be directly used as the predicted value of the pixel value of the current pixel. Otherwise, the following operation may be performed. First, the corresponding location of the reference pixel in the expansion area is determined based on a relative location offset between the reference pixel and the current pixel. As shown in FIG. 15B, the reference pixel T is not located in the face in which the current pixel P is located. It can be learned based on the relative location offset between the reference pixel and the current pixel that, the reference pixel T should be located in an area corresponding to a rear face in the expansion area. If the expansion area is disposed based on an actual relative spatial location, as shown in FIG. 15D, the location of the reference pixel in the expansion area is determined based on the relative location offset. Otherwise, the location of the reference pixel in the expansion area may be determined based on a specific method for disposing the expansion area.

203: Determine a predicted value of a pixel value of the current pixel.

After the corresponding location of the reference pixel in the expansion area is determined, the pixel value at the location is used as the predicted value of the pixel value of the current pixel.

It should be understood that, the pixel in the expansion area may be an integral pixel, or may be a fractional pixel. If the pixel is a fractional pixel, a specific pixel value may be ½ precision, ¼ precision, ⅛ precision, and the like.

In addition, after the location of the reference pixel in the expansion area is determined, if there is no pixel value at the location, an interpolation operation may be performed on the reference pixel. A specific interpolation operation method may be discrete cosine transform (DCT) interpolation, bi-linear interpolation, or another interpolation method.

It should be understood that, a difference between the method shown in FIG. 14 and the method shown in FIG. 5 lies in that, in FIG. 14, a location of the target reference pixel of the current pixel in the extension area is calculated first such that the target reference pixel can be easily found when the current pixel is predicted, thereby omitting a calculation process of determining the location of the target reference pixel based on the location of the initial reference pixel. However, in the method shown in FIG. 5, when the pixel value of the current pixel is predicted, the location of the target reference pixel is determined based on the location of the initial reference pixel. There is one more calculation process than the method shown in FIG. 14. In addition, other steps in the method shown in FIG. 14 are basically the same as other steps in the method shown in FIG. 5. For brevity, repeated descriptions are properly omitted.

Figure 16:
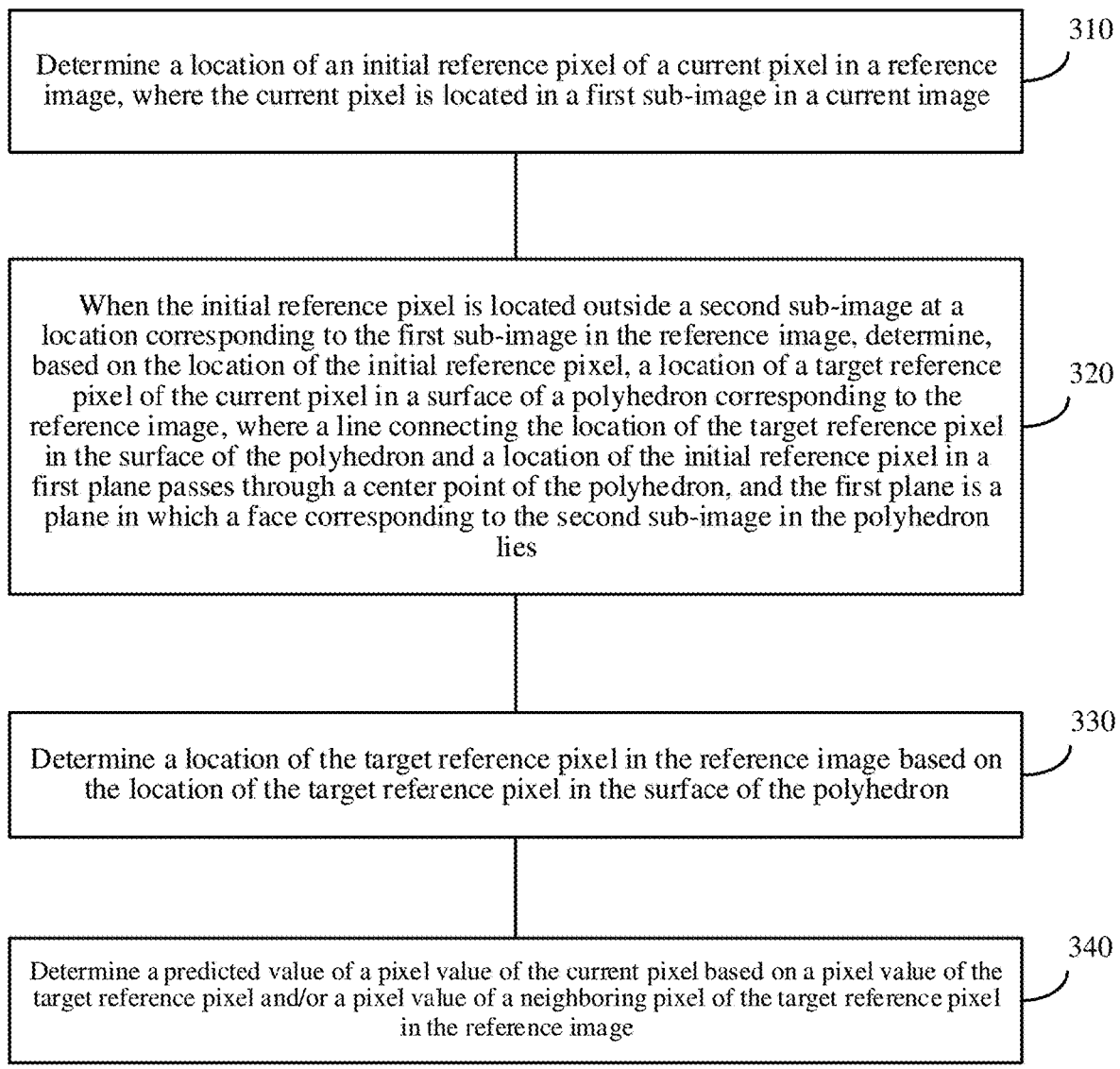
FIG. 16 is a schematic flowchart of a motion compensating prediction method according to an embodiment of the present disclosure.

FIG. 16 is a schematic flowchart of a motion compensating prediction method according to an embodiment of the present disclosure. The method shown in FIG. 16 includes the following steps.

310: Determine a location of an initial reference pixel of a current pixel in a reference image, where the current pixel is located in a first sub-image in a current image.

320: When the initial reference pixel is located outside a second sub-image at a location corresponding to the first sub-image in the reference image, determine, based on the location of the initial reference pixel, a location of a target reference pixel of the current pixel in a surface of a polyhedron corresponding to the reference image, where a line connecting the location of the target reference pixel in the surface of the polyhedron and a location of the initial reference pixel in a first plane passes through a center point of the polyhedron, and the first plane is a plane in which a face corresponding to the second sub-image in the polyhedron lies.

330: Determine a location of the target reference pixel in the reference image based on the location of the target reference pixel in the surface of the polyhedron.

340: Determine a predicted value of a pixel value of the current pixel based on a pixel value of the target reference pixel and/or a pixel value of a neighboring pixel of the target reference pixel in the reference image.

In this embodiment of the present disclosure, when the initial reference pixel is located outside the second sub-image, the target reference pixel that can really provide a reference effect is found based on the location of the initial reference pixel, and then the pixel value of the current pixel is predicted based on the target reference pixel, thereby improving accuracy of motion compensating prediction.

It should be understood that, in this embodiment of the present disclosure, a difference between the motion compensating prediction method shown in FIG. 5 and the motion compensating prediction method shown in FIG. 16 lies in that, in FIG. 5, the location of the target reference pixel in the reference image is determined directly based on the location of the initial reference pixel. However, in FIG. 15, the location of the target reference pixel in the surface of the polyhedron corresponding to the reference image is determined based on the location of the initial reference pixel first, and then the location of the target reference pixel in the reference image is determined based on the location of the target reference pixel in the surface of the polyhedron. Descriptions and explanations of the motion compensating prediction method shown in FIG. 5 are also applicable to the motion compensating prediction method shown in FIG. 16. Therefore, for brevity, repeated descriptions are properly omitted herein.

Optionally, in an embodiment, the determining, based on the location of the initial reference pixel, a location of a target reference pixel of the current pixel in a surface of a polyhedron corresponding to the reference image includes determining the location of the initial reference pixel in the first plane based on the location of the initial reference pixel and layout information of the reference image, and determining the location of the target reference pixel in the surface of the polyhedron based on the location of the initial reference pixel in the first plane and the layout information of the reference image.

Optionally, in an embodiment, the determining a location of the target reference pixel in the reference image based on the location of the target reference pixel in the surface of the polyhedron includes determining the location of the target reference pixel in the reference image based on the location of the initial reference pixel and the layout information of the reference image, where the location of the target reference pixel in the surface of the polyhedron is an intersection point between the surface of the polyhedron and a line connecting the initial reference pixel and the center point of the polyhedron.

It should be understood that, the motion compensating prediction method in this embodiment of the present disclosure is applicable to two-dimensional images in various polyhedral formats. In addition, the motion compensating prediction method in this embodiment of the present disclosure is also applicable to cases in which a face is rotated, a face arrangement order is changed, and a face spatial layout format is changed for a two-dimensional image in a polyhedral format.

It should be understood that, in this embodiment of the present disclosure, the pixel value at the location of the target reference pixel may be calculated when the pixel value of the current pixel is predicted. Alternatively, a pixel value of a target reference pixel of a to-be-processed pixel may be pre-calculated such that the pixel value of the target reference pixel of the to-be-processed pixel may be directly obtained when the to-be-processed pixel is processed, thereby reducing an image processing time.

It should be understood that, although the two-dimensional image in the hexahedron format is used as an example in the foregoing descriptions. However, the method is also applicable to two-dimensional images in other polyhedral formats, including a tetrahedron format, an octahedron format, and another polyhedron format.

It should be understood that, the motion compensating prediction method in this embodiment of the present disclosure is described above in detail by using a two-dimensional image in a 4×3 format as an example. For a polyhedron two-dimensional image in another type of format, the motion compensating prediction method in this embodiment of the present disclosure is also applicable. A case in which some or all of faces in a two-dimensional image are rotated, a different face arrangement order, a different arrangement method, and another case are also applicable to the motion compensating prediction method in this embodiment of the present disclosure.

It should be understood that, in the embodiments, the pixel value of the reference pixel in the reference image may be directly used as the predicted value of the pixel value of the current pixel, or a weighted value of the pixel value of the reference pixel and the pixel value of the neighboring pixel of the reference pixel or a pixel value obtained through another operation may be used as the predicted value of the pixel value of the current pixel.

The motion compensating prediction method in the embodiments of the present disclosure is described above in detail with reference to FIG. 1 to FIG. 16, and a motion compensating prediction apparatus in embodiments of the present disclosure is described below in detail with reference to FIG. 17 to FIG. 22. It should be understood that, the motion compensating prediction apparatus in FIG. 17 to FIG. 22 can perform the steps in the motion compensating prediction method in FIG. 1 to FIG. 16. To avoid repetitions, repeated descriptions are properly omitted.

Figure 17:
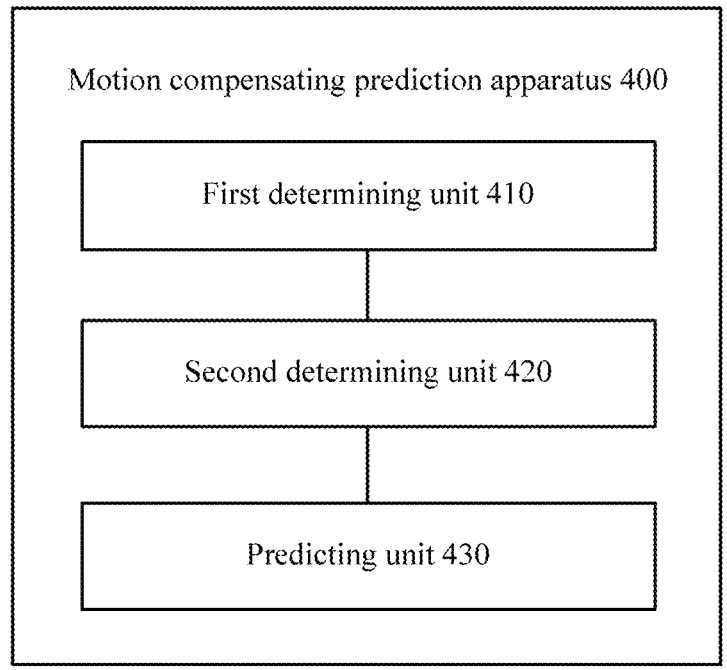
FIG. 17 is a schematic block diagram of a motion compensating prediction apparatus according to an embodiment of the present disclosure.

FIG. 17 is a schematic block diagram of a motion compensating prediction apparatus according to an embodiment of the present disclosure. The motion compensating prediction apparatus 400 includes a first determining unit 410 configured to determine a location of an initial reference pixel of a current pixel in a reference image, where the current pixel is located in a first sub-image in the current image, a second determining unit 420 configured to, when the initial reference pixel is located outside a second sub-image at a location corresponding to the first sub-image in the reference image, determine a location of a target reference pixel of the current pixel in the reference image based on the location of the initial reference pixel, where a line connecting a location of the target reference pixel in a surface of a polyhedron corresponding to the reference image and a location of the initial reference pixel in a first plane passes through a center point of the polyhedron, the location of the target reference pixel in the surface of the polyhedron is determined based on the location of the initial reference pixel and layout information of the polyhedron corresponding to the reference image, the first plane is a plane in which a face corresponding to the second sub-image in the polyhedron lies, and location precision of the target reference pixel is limited to being less than or equal to preset pixel location precision, and a predicting unit 430 configured to determine a predicted value of a pixel value of the current pixel based on a pixel value of the target reference pixel and/or a pixel value of a neighboring pixel of the target reference pixel.

In this embodiment of the present disclosure, when the initial reference pixel is located outside the second sub-image, due to impact of geometric distortion of a sub-image boundary of a two-dimensional image, it is inaccurate to predict the current pixel directly based on the initial reference pixel. Therefore, in this case, in the present disclosure, the target reference pixel that can really provide a reference effect is found based on the location of the initial reference pixel, and then the pixel value of the current pixel is predicted based on the target reference pixel, thereby improving accuracy of motion compensating prediction.

Optionally, in an embodiment, the motion compensating prediction apparatus 400 further includes a determining unit 440 configured to determine, based on the layout information of the reference image and the location of the initial reference pixel, whether the initial reference pixel is located outside the second sub-image in the reference image.

Optionally, in an embodiment, the second determining unit 420 is configured to determine the location of the target reference pixel in the surface of the polyhedron based on the location of the initial reference pixel and the layout information of the reference image, where the location of the target reference pixel in the surface of the polyhedron is an intersection point between the surface of the polyhedron and a line connecting the initial reference pixel and the center point of the polyhedron, and determine the location of the target reference pixel in the reference image based on the location of the target reference pixel in the surface of the polyhedron and the layout information of the reference image.

Optionally, in an embodiment, the second determining unit 420 is configured to determine the location of the initial reference pixel in the first plane based on the location of the initial reference pixel and the layout information of the reference image, and determine the location of the target reference pixel in the surface of the polyhedron based on the location of the initial reference pixel in the first plane and the layout information of the reference image.

Optionally, in an embodiment, the layout information includes at least one of face quantity information of the polyhedron, sub-image arrangement manner information of the reference image, sub-image arrangement order information of the reference image, and sub-image rotation information of the reference image.

Optionally, in an embodiment, the predicting unit 430 is configured to determine the pixel value of the target reference pixel as the predicted value of the pixel value of the current pixel.

Optionally, in an embodiment, the predicting unit 430 is configured to weight the pixel value of the target reference pixel and the pixel value of the neighboring pixel of the target reference pixel, and determine a pixel value that is at the location that is of the target reference pixel and that is obtained through the weighting as the predicted value of the pixel value of the current pixel.

Optionally, in an embodiment, the predicting unit 430 is configured to: perform an interpolation operation at the location of the target reference pixel based on the pixel value of the neighboring pixel of the target reference pixel, and determine a pixel value obtained through the interpolation operation as the predicted value of the pixel value of the current pixel.

Figure 18:
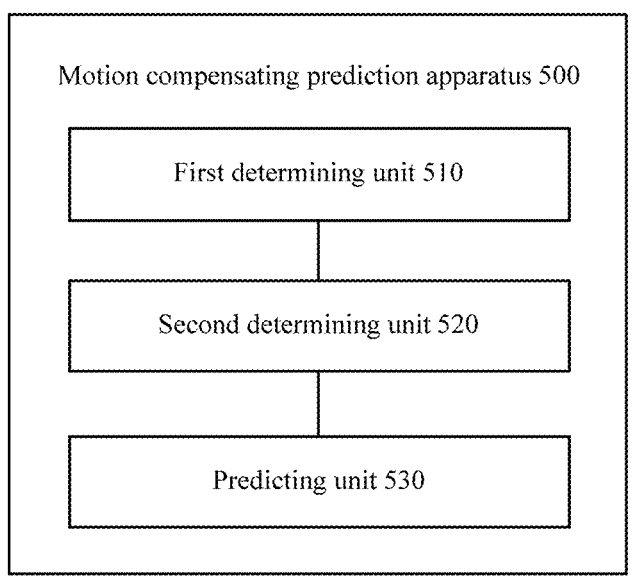
FIG. 18 is a schematic block diagram of a motion compensating prediction apparatus according to an embodiment of the present disclosure.

FIG. 18 is a schematic block diagram of a motion compensating prediction apparatus according to an embodiment of the present disclosure. The motion compensating prediction apparatus 500 includes a first determining unit 510 configured to determine a location of an initial reference pixel of a current pixel in a reference image, where the current pixel is located in a first sub-image in the current image, a second determining unit 520 configured to, when the initial reference pixel is located outside a second sub-image at a location corresponding to the first sub-image in the reference image, determine a location of a target reference pixel of the current pixel in an expansion area of the second sub-image, where the expansion area of the second sub-image is located outside the second sub-image, the expansion area includes a plurality of pixels, a pixel value of any first pixel in the expansion area is determined based on a pixel value of a second pixel in the reference image, a line connecting a location of the second pixel in a surface of a polyhedron formed by the reference image and a location of the first pixel in a first plane passes through a center point of the polyhedron, the location of the second pixel in the face of the polyhedron is determined based on the location of the first pixel and layout information of the polyhedron corresponding to the reference image, the first plane is a plane in which a face corresponding to the second sub-image in the polyhedron lies, and location precision of the second pixel is limited to being less than or equal to preset pixel location precision, and a predicting unit 530 configured to determine a predicted value of a pixel value of the current pixel based on a pixel value of the target reference pixel and/or a pixel value of a neighboring pixel of the target reference pixel.

In this embodiment of the present disclosure, when the initial reference pixel is located outside the second sub-image, due to impact of geometric distortion of a sub-image boundary of a two-dimensional image, it is inaccurate to predict the current pixel directly based on the initial reference pixel. Therefore, in this case, in the present disclosure, the target reference pixel that can really provide a reference effect is directly found in the expansion area directly based on the current pixel and motion information of the current pixel, and then the pixel value of the current pixel is predicted based on the target reference pixel such that the target reference pixel can be rapidly found, and accuracy of motion compensating prediction can be further improved.

Optionally, in an embodiment, the motion compensating prediction apparatus further includes a third determining unit 540, where the third determining unit 540 is configured to determine the location of the second pixel in the surface of the polyhedron based on the location of the first pixel and the layout information of the reference image, where the location of the second pixel in the surface of the polyhedron is an intersection point between the surface of the polyhedron and a line connecting the first pixel and the center point of the polyhedron, and determine a location of the second pixel in the reference image based on the location of the second pixel in the surface of the polyhedron and the layout information of the reference image.

Optionally, in an embodiment, the motion compensating prediction apparatus further includes a determining unit 550 configured to determine, based on the layout information of the reference image and the location of the initial reference pixel, whether the initial reference pixel is located outside the second sub-image in the reference image.

Figure 19:
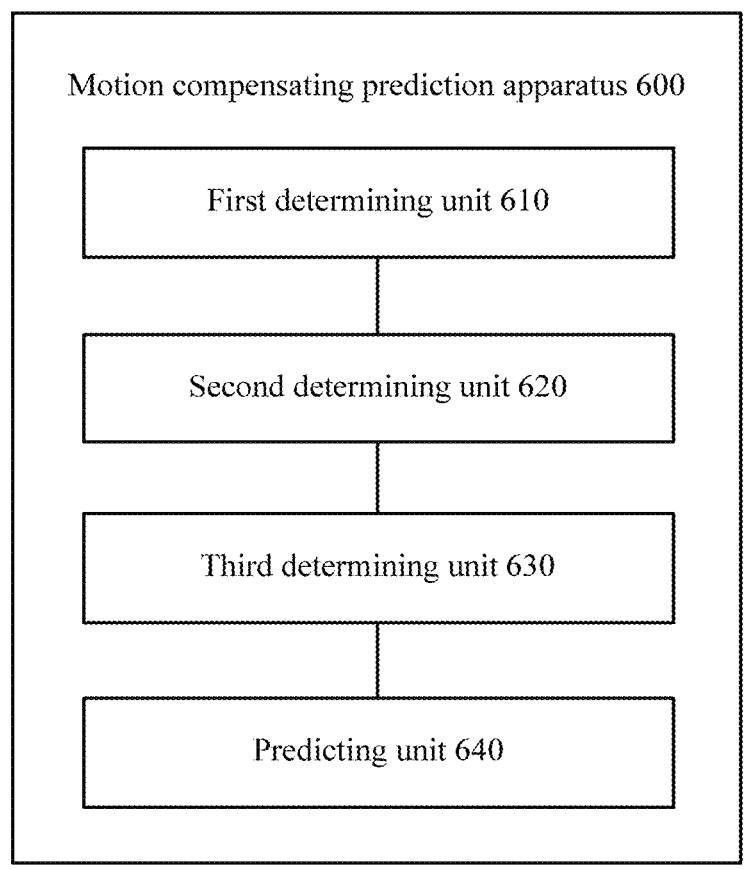
FIG. 19 is a schematic block diagram of a motion compensating prediction apparatus according to an embodiment of the present disclosure.

FIG. 19 is a schematic block diagram of a motion compensating prediction apparatus according to an embodiment of the present disclosure. The motion compensating prediction apparatus 600 includes a first determining unit 610 configured to determine a location of an initial reference pixel of a current pixel in a reference image, where the current pixel is located in a first sub-image in the current image, a second determining unit 620 configured to, when the initial reference pixel is located outside a second sub-image at a location corresponding to the first sub-image in the reference image, determine, based on the location of the initial reference pixel, a location of a target reference pixel of the current pixel in a surface of a polyhedron corresponding to the reference image, where a line connecting the location of the target reference pixel in the surface of the polyhedron and a location of the initial reference pixel in a first plane passes through a center point of the polyhedron, and the first plane is a plane in which a face corresponding to the second sub-image in the polyhedron lies, a third determining unit 630 configured to determine a location of the target reference pixel in the reference image based on the location of the target reference pixel in the surface of the polyhedron, and a predicting unit 640 configured to determine a predicted value of a pixel value of the current pixel based on a pixel value of the target reference pixel and/or a pixel value of a neighboring pixel of the target reference pixel in the reference image.

In this embodiment of the present disclosure, when the initial reference pixel is located outside the second sub-image, due to impact of geometric distortion of a sub-image boundary of a two-dimensional image, it is inaccurate to predict the current pixel directly based on the initial reference pixel. Therefore, in this case, in the present disclosure, the target reference pixel that can really provide a reference effect is found based on the location of the initial reference pixel, and then the pixel value of the current pixel is predicted based on the target reference pixel, thereby improving accuracy of motion compensating prediction. Location precision of the target reference pixel is limited to being less than or equal to preset pixel location precision.

Optionally, in an embodiment, the second determining unit 620 is configured to determine the location of the initial reference pixel in the first plane based on the location of the initial reference pixel and layout information of the reference image, and determine the location of the target reference pixel in the surface of the polyhedron based on the location of the initial reference pixel in the first plane and the layout information of the reference image.

Optionally, in an embodiment, the third determining unit is configured to determine the location of the target reference pixel in the reference image based on the location of the initial reference pixel and the layout information of the reference image, where the location of the target reference pixel in the surface of the polyhedron is an intersection point between the surface of the polyhedron and a line connecting the initial reference pixel and the center point of the polyhedron.

The motion compensating prediction method and the motion compensating prediction apparatus in the embodiments of the present disclosure are described above with reference to FIG. 1 to FIG. 19. Actually, the motion compensating prediction method in the embodiments of the present disclosure may be considered as a middle process or step in an encoding or decoding process. A panoramic video encoder or a panoramic video decoder may implement the motion compensating prediction method in the embodiments of the present disclosure. A decoding process of the panoramic video decoder and an encoding process of the panoramic video encoder are respectively described below in detail with reference to FIG. 20 and FIG. 21.

Before the decoding process of the panoramic video decoder is described with reference to FIG. 20, some mechanisms of encoding and decoding an image by using the encoder and the decoder are briefly described first.

Before a current image is encoded, the current image is usually divided into several blocks having equal sizes, and then each block is encoded. During an encoding process of the current image, layout information of the current image is usually transmitted to a decoder side as header information. The header information is precursor information. After receiving an encoded bitstream, the decoder decodes the header information first, and then decodes a subsequent bitstream based on the header information. Assuming that during encoding, the current image is divided into a plurality of image blocks, and the plurality of image blocks are encoded in a sequence, the decoder performs decoding in the same sequence. For a current block, if it is determined that an encoding manner of the current block is in an inter-frame encoding manner. To obtain reconstruction information of the current block, a reconstruction value of a pixel value of a pixel in the current block may be obtained.

Figure 20:
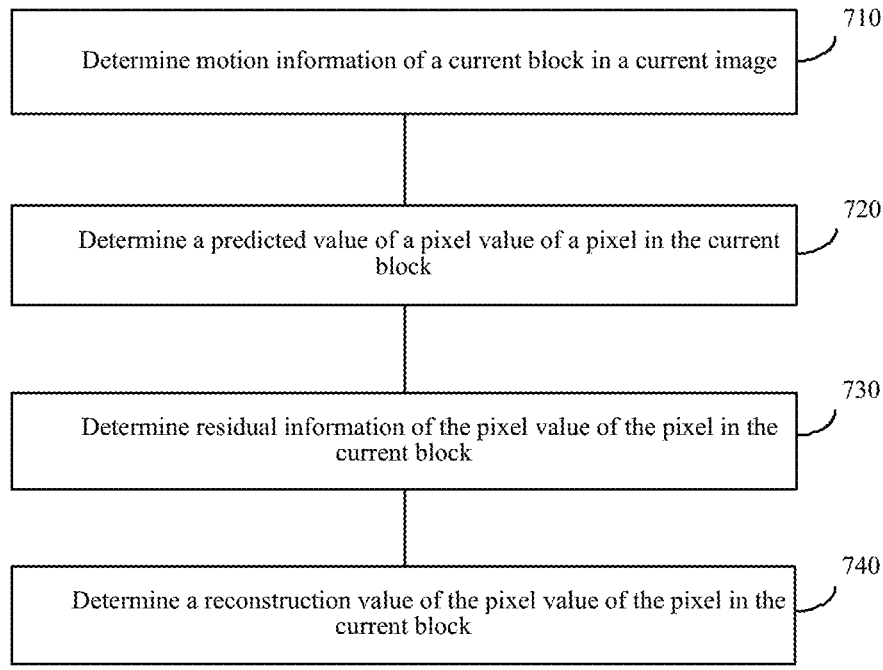
FIG. 20 is a schematic flowchart of a decoding process of a panoramic video decoder.

FIG. 20 is a schematic flowchart of a decoding process of a panoramic video decoder. The decoding process includes the following steps.

710: Determine motion information of a current block in a current image.

In an embodiment, a decoder may decode a motion information bitstream, and determine the motion information of the current block based on a parsing result.

It should be understood that, in step 710, the motion information of the current block may alternatively be determined by decoding indication information of predictive motion information and difference information between the predictive motion information and the motion information. To be specific, the motion information of the current block may be determined without directly parsing the encoded bitstream of the motion information. For example, a decoder side may construct a motion information set (for example, the motion information set includes motion information of a temporal or spatial neighboring reconstructed block of the current block, and a construction method of the set is agreed upon by both an encoder side and the decoder side) such that the decoder side can parse the indication information of the predictive motion information, then determine the predictive motion information in the set, and obtain the motion information of the current block based on the predictive motion information and the difference information between the predictive motion information and the motion information. In addition, it should be understood that, the decoder side may alternatively use the predictive motion information that is determined based on the indication information of the predictive motion information as the motion information of the current block. A specific method to be used is agreed upon by both the encoder side and the decoder side. Alternatively, the encoder side transmits information about a manner used by the encoder side to the decoder side, and the decoder side determines the motion information of the current block based on the received manner information.

In addition, in step 710, if unidirectional reference is used in the method, a set of motion information may be parsed. If bidirectional reference is used in the method, two sets of motion information maybe parsed. A specific quantity of to-be-parsed sets of motion information is agreed upon by both the encoder side and the decoder side. Alternatively, the encoder side transmits information about a quantity of sets of motion information that are used by the encoder side to the decoder side, and the decoder side determines a quantity of to-be-parsed sets of motion information based on a parsing result.

720: Determine a predicted value of a pixel value of a pixel in the current block.

The decoder may determine, based on the motion information of the current block, a reference image of the current image in which the current block is located, and determine a location of a reference block in the reference image. Actually, the determining a predicted value of a pixel value of a pixel in the current block is determining a predicted value of a pixel value of each pixel in the current block. The predicted value of the pixel value of the pixel may be determined according to the motion compensating prediction method in the embodiments of the present disclosure.

It should be understood that, after the predicted value of the pixel value of each pixel in the current block is obtained, a predictive block of the current block may be obtained based on the predicted value of the pixel value of each pixel. The predictive block includes the predicted value of the pixel value of each pixel in the current block.

In step 720, if unidirectional reference is used in the method, only a location of a reference block in the reference image may be determined. For a pixel in the current block, only a location of a reference pixel may be determined, and then the predicted value of the pixel value of the pixel in the current block may be determined according to the motion compensating prediction method in the embodiments of the present disclosure.

If bidirectional reference is used in the method, locations of two reference blocks of the current block in respective reference images maybe determined. For a pixel in the current block, locations of two reference pixels in two reference blocks maybe respectively determined, then two predicted values of a pixel value of the pixel in the current block may be determined according to the motion compensating prediction method in the embodiments of the present disclosure, and then weighting or another operation is performed on the two predicted values, to obtain a predicted value of the pixel value of the pixel in the current block. A specific operation manner is agreed upon by both the encoder side and the decoder side. Alternatively, the encoder side transmits a method used by the encoder side to the decoder side, and the decoder side determines a to-be-used method based on a parsing result.

In addition, after the predicted value of the pixel value of the pixel in the current block is obtained, another operation may be performed on the predicted value first, and a predicted value obtained through the operation is used as a final predicted value of a pixel value of a current pixel. For example, a predicted value obtained after smooth filtering is performed on the obtained predicted value may be used as the final predicted value of the pixel value of the current pixel. In an embodiment, whether to use a manner and which manner is used are agreed upon by both the encoder side and the decoder side. Alternatively, the encoder side transmits a method used by the encoder side to the decoder side, and the decoder side determines a to-be-used method based on a parsing result. In addition, alternatively, bidirectional prediction may be performed on the pixel value of the current pixel. To be specific, two predictions may be performed on the current pixel, and then two obtained predicted values are weighted to obtain the predicted value of the pixel value of the current pixel.

730: Determine residual information of the pixel value of the pixel in the current block.

The decoder decodes an encoded bitstream of residual information of the pixel value of the pixel in the current block, and obtains the residual information of the pixel value of the pixel in the current block by using a dequantization and inverse transform method. To be specific, the encoder decodes an encoded bitstream of a residual block of the current block, and then obtains the residual block of the current block by using the dequantization and inverse transform method.

It should be understood that, in step 730, to determine the residual information of the pixel value of the pixel in the current block, only an inverse transform method or a dequantization method may alternatively be used. A specific method to be used is agreed upon by both the encoder side and the decoder side. Alternatively, the encoder side transmits a method used by the encoder side to the decoder side, and the decoder side determines a to-be-used method based on a parsing result.

740: Determine a reconstruction value of the pixel value of the pixel in the current block.

The reconstruction value of the pixel value of each pixel in the current block may be obtained based on the pixel value of the pixel in the current block that is obtained in step 720 and the residual information of the pixel value of the pixel in the current block that is obtained in step 730. In addition, alternatively, a reconstructed block of the current block may be obtained by adding the predictive block of the current block that is obtained in step 720 and the residual block obtained in step 730 together. The reconstructed block includes the reconstruction value of the pixel value of each pixel in the current block.

It should be understood that, in step 740, to obtain the reconstruction value of the pixel value of the pixel in the current block, after predictive information and the residual information are added together, some other operations, for example, deblocking filtering, may also may be performed. In an embodiment, whether another operation is required and which operation is required are agreed upon by both the encoder side and the decoder side. Alternatively, the encoder side transmits a method used by the encoder side to the decoder side, and the decoder side determines a to-be-used method based on a parsing result.

The decoding process of the panoramic video decoder is described above in detail with reference to FIG. 20. Actually, the decoding process is usually performed on an encoded bitstream obtained through encoding. An encoding process is described below in detail by using a panoramic video encoder as an example with reference to FIG. 21.

Usually, layout information of a spherical image may be determined after the spherical image is collected or generated. Therefore, before the encoder encodes a panoramic video, the encoder already learns of layout information of a spherical image. The layout information of the spherical image is usually transmitted as header information. The header information is precursor information. Therefore, before receiving an encoded bitstream, the decoder decodes the header information first. After obtaining the layout information of the spherical image, the encoder may decode a subsequent bitstream based on the header information.

Figure 21:
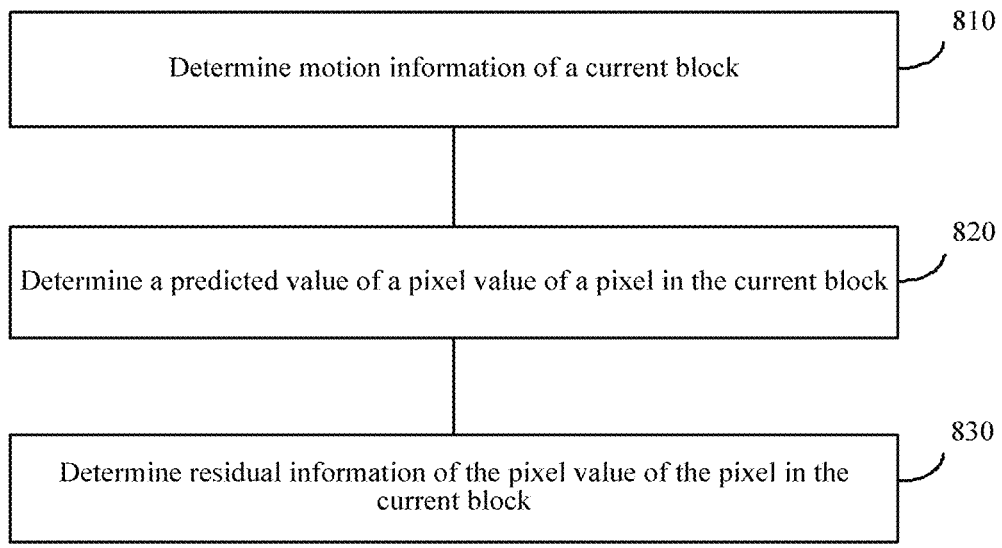
FIG. 21 is a schematic flowchart of an encoding process of a panoramic video decoder.

FIG. 21 is a schematic flowchart of an encoding process of a panoramic video decoder. The encoding process includes.

810: Determine motion information of a current block.

The encoder determines the motion information of the current block first, and then encodes the motion information. In an embodiment, the encoder selects a reference image for a current image in one or more reconstructed images, searches a specified area in the reference image for a matching block for the current block, and uses the matching block as a reference block of the current block. In addition, the encoder uses the reference image and motion vector information indicating a location offset of the reference block relative to the current block that are used in the process as the motion information, and encodes the motion information.

When the specified area in the reference image is searched for the reference block for the current block, a plurality of blocks may be selected for the current block first, and a block finally selected as the reference block may be determined by using a rate-distortion optimization rule. For example, a rate-distortion value of a pixel value of a pixel in the current block is predicted by determining a quantity of bits of the motion information that maybe encoded when a candidate reference block is used as the matching block, and a pixel value of a pixel in the current candidate reference block, and a cost of the candidate reference block is determined by using a Lagrange optimization method. Then, a candidate reference block having a lowest cost is selected as the matching block. For a plurality of reference images, the foregoing operations maybe performed on each image.

It should be understood that, in step 810, indication information of predictive motion information may alternatively be encoded or difference information between the predictive motion information and the motion information may be encoded, without directly encoding the motion information. For example, an encoder side may construct a motion information set (for example, the motion information set includes motion information of a temporal or spatial neighboring reconstructed block of the current block, and a construction method of the set is agreed upon by both the encoder side and a decoder side) such that the encoder side can select one piece of motion information from the motion information set as the predictive motion information, then obtain difference information between the motion information of the current block and the predictive motion information, and encode indication information of the predictive motion information and the difference information. In addition, only the indication information of the predictive motion information may alternatively be encoded such that the decoder side can determine motion information in the constructed motion information set based on the indication information, and use the motion information as the motion information of the current block. A specific method to be used is agreed upon by both the encoder side and the decoder side. Alternatively, the encoder side may select a method by using a rate-distortion method, and transmit the selected method to the decoder side.

In step 810, if unidirectional reference is used in the method, only a set of motion information maybe encoded. If bidirectional reference is used in the method, two sets of motion information maybe encoded. A specific quantity of to-be-encoded sets of motion information is agreed upon by both the encoder side and the decoder side. Alternatively, the encoder side may determine a specific quantity of to-be-encoded sets of motion information by using a rate-distortion method, and transmit the corresponding information to the decoder side.

If unidirectional reference is used, a location of a reference block in the reference image maybe determined. For a current pixel in the current block, a location of a reference pixel maybe determined, and then a predicted value of a pixel value of the reference pixel is determined according to the motion compensating prediction method in the embodiments of the present disclosure. If bidirectional reference is used, locations of two reference blocks of the current block in respective reference images maybe determined. To be specific, for a pixel in the current block, locations of two reference pixels in two reference blocks maybe respectively determined, then two predicted values of a pixel value of the pixel in the current block may be determined according to the motion compensating prediction method in the embodiments of the present disclosure, and then weighting or another operation is performed on the two predicted values, to obtain a predicted value of the pixel value of the pixel in the current block. A specific operation manner is agreed upon by both the encoder side and the decoder side. Alternatively, the encoder side transmits a method used by the encoder side to the decoder side, and the decoder side determines a to-be-used method based on a parsing result.

820: Determine a predicted value of a pixel value of a pixel in the current block.

The encoder may determine, based on the motion information of the current block, a reference image of the current image in which the current block is located, and determine a location of a reference block in the reference image. Actually, the determining a predicted value of a pixel value of a pixel in the current block is determining a predicted value of a pixel value of each pixel in the current block. The predicted value of the pixel value of the pixel may be determined according to the motion compensating prediction method in the embodiments of the present disclosure.

In addition, after the predicted value of the pixel value of the pixel in the current block is obtained, another operation may be performed on the predicted value first, and a predicted value obtained through the operation is used as a final predicted value of a pixel value of a current pixel. For example, a predicted value obtained after smooth filtering is performed on the obtained predicted value may be used as the final predicted value of the pixel value of the current pixel. In an embodiment, whether to use a manner and which manner is used are agreed upon by both the encoder side and the decoder side. Alternatively, the encoder side transmits a method used by the encoder side to the decoder side, and the decoder side determines a to-be-used method based on a parsing result. In addition, alternatively, bidirectional prediction may be performed on the pixel value of the current pixel. To be specific, two predictions may be performed on the current pixel, and then two obtained predicted values are weighted to obtain the predicted value of the pixel value of the current pixel.

830: Determine residual information of the pixel value of the pixel in the current block.

The encoder substrates the predicted value of the pixel value of the pixel in the current block from the pixel value of the pixel in the current block, to obtain the residual information of the pixel value of the pixel in the current block, then processes the residual information of the pixel value of the pixel in the current block according to a transform and quantization method, and encodes a result obtained through the processing.

It should be understood that, when the residual information of the pixel value of the pixel in the current block is encoded, only a transform method or a quantization method may alternatively be used. A specific method to be used is agreed upon by both the encoder side and the decoder side. Alternatively, the encoder side determines a method by using a rate-distortion method, and transmits the information to the decoder side.

Figure 22:
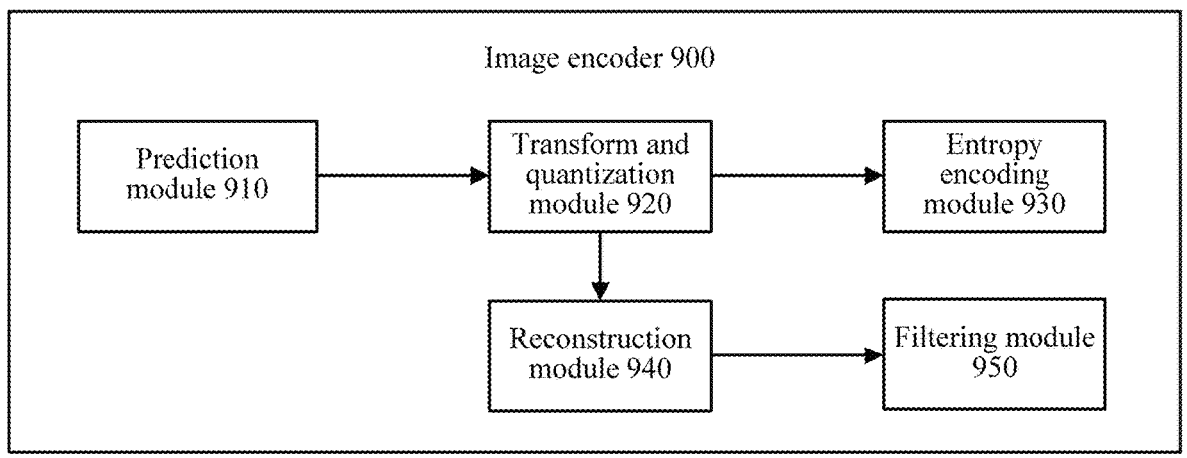
FIG. 22 is a schematic block diagram of an image encoder according to an embodiment of the present disclosure.

FIG. 22 is a schematic block diagram of an image encoder 900 according to an embodiment of the present disclosure. The image encoder 900 includes a prediction module 910, a transform and quantization module 920, an entropy encoding module 930, a reconstruction module 940, and a filtering module 950. Various functions of the modules are as follows.

The prediction module 910 is configured to generate predictive data. The prediction module 910 may generate one or more predicting units (PUs) of each computing unit (CU) cannot be further divided. PUs of the CU may be associated with different smaller pixel blocks in a pixel block of the CU. The prediction module 910 may generate a predictive pixel block for each PU of the CU. The prediction module 910 may generate the predictive pixel block for the PU through intra-frame prediction or inter-frame prediction. If generating the predictive pixel block for the PU through intra-frame prediction, the prediction module 910 may generate the predictive pixel block for the PU based on pixels, of a picture associated with the PU, obtained after decoding. If generating the predictive pixel block for the PU through inter-frame prediction, the prediction module 910 may generate the predictive pixel block for the PU based on pixels, of one or more pictures different from the picture associated with the PU, obtained after decoding. The prediction module 910 may generate a residual pixel block for the CU based on the predictive pixel block for the PU of the CU. The residual pixel block for the CU may indicate a difference between a sample value in the predictive pixel block for the PU of the CU and a corresponding sample value in an initial pixel block of the CU.

The transform and quantization module 920 is configured to process residual data obtained through prediction. The image encoder 900 may perform recursive quadtree partitioning on the residual pixel block for the CU, to partition the residual pixel block for the CU into one or more smaller residual pixel blocks associated with a transform unit (TU) of the CU. Pixels in a pixel block associated with the TU each correspond to one luminance sample and two chrominance samples. Therefore, each TU may be associated with one luminance residual sample block and two chrominance residual sample blocks. The image encoder 900 may apply one or more transforms to a residual sample block associated with the TU to generate a coefficient block (that is, a block of a coefficient). The transform may be a DCT transform or a variant thereof. A two-dimensional transform is calculated by using a DCT transform matrix and by applying a one-dimensional transform in horizontal and vertical directions, to obtain the coefficient block. The image encoder 900 may perform a quantization procedure on each coefficient in the coefficient block. Quantization usually refers to a process in which a coefficient is quantized to reduce a data volume used to indicate the coefficient, for further compression.

The image encoder 900 may generate a set of syntactic elements indicating a coefficient in the quantized coefficient block. The image encoder 900 may apply, by using the entropy encoding module 930, an entropy encoding operation (for example, a context-adaptive binary arithmetic coding (CABAC) operation) to some or all of the foregoing syntactic elements. To apply CABAC encoding to the syntactic elements, the entropy encoding module 930 may binarize the syntactic elements to form a binary sequence including one or more bits (referred to as "binary bits"). The entropy encoding module 930 may encode some of the binary bits through regular (regular) encoding, and may encode the remaining binary bits through bypass (bypass) encoding.

In addition to performing entropy encoding on the syntactic elements of the coefficient block, the image encoder 900 may apply, by using the reconstruction module 940, inverse quantization and an inverse transform to a transformed coefficient block, to reconstruct a residual sample block by using the transformed coefficient block. The image encoder 900 may add the reconstructed residual sample block to a sample block corresponding to one or more predictive sample blocks, to generate a reconstructed sample block. The image encoder 900 may reconstruct, by reconstructing a sample block of each color component, the pixel block associated with the TU. A pixel block of each TU of the CU is reconstructed in such a manner until an entire pixel block of the CU is reconstructed.

After the image encoder 900 reconstructs the pixel block of the CU, the image encoder 900 performs a deblocking filtering operation by using the filtering module 950, to reduce a blocking effect of the pixel block associated with the CU. After performing the deblocking filtering operation, the image encoder 900 may modify the reconstructed pixel block of the CTB of the picture by using a sample adaptive offset (SAO). After performing such operations, the image encoder 900 may store the reconstructed pixel block of the CU in a decoded picture buffer, to generate a predictive pixel block for another CU.

In one or more embodiments, the described functions may be implemented by using hardware, software, firmware, or any combination thereof. If the functions are implemented by using the software, the functions may be stored in a computer-readable medium as one or more instructions or code lines, or sent by a computer-readable medium, and is/are executed by a processing unit based on the hardware. The computer-readable medium may include a computer-readable storage medium (which is corresponding to a tangible medium such as a data storage medium) or a communications medium, and the communications medium includes, for example, any medium that promotes transmission of data, by using a computer program, from a place to another place according to a communication protocol. In this manner, the computer-readable medium may be generally corresponding to (1) a non-transitory tangible computer-readable storage medium, or (2) a communications medium such as a signal or a carrier. A data storage medium may be accessed by one or more computers or one or more processors to retrieve an instruction, code, and/or a data structure for implementing any available medium in technologies described in the present disclosure. A computer program product may include a computer-readable medium.

By way of example and not limitation, some computer-readable storage media may include a random-access memory (RAM), a read only memory (ROM), an electrically erasable programmable ROM (EEPROM), a compact disc ROM (CD-ROM), another optical disc storage or magnetic disk storage, another magnetic storage apparatus, a flash memory, or any other medium that can store required program code in a form of an instruction or a data structure and can be accessed by a computer. In addition, any connection may be appropriately referred to as a computer-readable medium. For example, if an instruction is sent from a website, a server, or another remote source by using a coaxial cable, an optical cable, a twisted pair, a digital subscriber line (DSL), or a wireless technology (for example, infrared, radio, or microwave), the coaxial cable, the optical cable, the twisted pair, the DSL, or the wireless technology (for example, infrared, radio, or microwave) is included in a definition of a medium. However, it should be understood that the computer-readable storage medium and the data storage medium may not include a connection, a carrier, a signal, or another transitory medium, but are non-transitory tangible storage media. A disk and an optical disc used in this specification include a compact disc (CD), a laser disc, an optical disc, a digital versatile disc (DVD), a floppy disk, and a Blu-ray disc. The disk generally magnetically copies data, and the optical disc optically copies data by using a laser. A combination of the foregoing objects shall further be included in the scope of the computer-readable medium.

An instruction may be executed by one or more processors such as one or more digital signal processors (DSP), a general microprocessor, an application-specific integrated circuit (ASIC), a field programmable gate array (FPGA), or an equivalent integrated circuit or discrete logic circuits. Therefore, the term "processor" used in this specification may refer to the foregoing structure, or any other structure that may be applied to implementation of the technologies described in this specification. In addition, in some aspects, the functions described in this specification may be provided in a dedicated hardware and/or software module configured for encoding and decoding, or may be incorporated into a combined coder-decoder. In addition, the technologies may be completely implemented in one or more circuits or logic elements.

The technologies in the present disclosure may be widely implemented by multiple apparatuses or devices. The apparatuses or devices include a radio handset, an integrated circuit (IC), or an IC set (for example, a chip set). In the present disclosure, various components, modules, and units are described to emphasize functions of an apparatus that is configured to implement the disclosed technologies, and the functions do not necessarily may be implemented by different hardware units. Precisely, as described in the foregoing, various units may be combined into a coder-decoder hardware unit, or may be provided by a set of interoperable hardware units (including one or more processors described in the foregoing) and appropriate software and/or firmware.

It should be understood that "an implementation" or "one implementation" mentioned in the whole specification does not mean that particular features, structures, or characteristics related to the implementation are included in at least one implementation of the present disclosure. Therefore, "in an implementation" or "in one implementation" appearing throughout the specification does not refer to a same implementation. In addition, these particular features, structures, or characteristics may be combined in one or more implementations by using any appropriate manner.

It should be understood that sequence numbers of the foregoing processes do not mean execution sequences in various implementations of the present disclosure. The execution sequences of the processes should be determined according to functions and internal logic of the processes, and should not be construed as any limitation on the implementation processes of the implementations of the present disclosure.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that in the implementations of this application, "B corresponding to A" indicates that B is associated with A, and B may be determined according to A. However, it should further be understood that determining A according to B does not mean that B is determined according to A only, that is, B may also be determined according to A and/or other information.

A person of ordinary skill in the art may be aware that, in combination with the examples described in the implementations disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of the present disclosure may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present disclosure essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of the present disclosure. The foregoing storage medium includes any medium that can store program code, such as a universal serial bus (USB) flash drive, a removable hard disk, a ROM, a RAM, a magnetic disk, or an optical disc.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A motion compensating prediction method, comprising:
   determining a location of an initial reference pixel of a current pixel in a reference image, wherein the current pixel is located in a first sub-image of a current image;
   determining a location of a target reference pixel of the current pixel in the reference image based on the location of the initial reference pixel in response to the initial reference pixel being located outside a second sub-image at a location corresponding to the first sub-image in the reference image, wherein a line connects a location of the target reference pixel in a surface of a polyhedron corresponding to the reference image and a location of the initial reference pixel in a first plane passing through a center point of the polyhedron, wherein the location of the target reference pixel in the surface of the polyhedron is based on the location of the initial reference pixel and layout information of the polyhedron corresponding to the reference image, wherein the first plane is a plane in which a face corresponding to the second sub-image in the polyhedron lies, and wherein location precision of the target reference pixel is less than or equal to preset pixel location precision; and determining a predicted value of a pixel value of the current pixel based on at least one of a pixel value of the target reference pixel or a pixel value of a neighboring pixel of the target reference pixel.

2. The motion compensating prediction method according to claim 1, wherein the method further comprises determining whether the initial reference pixel is located outside the second sub-image in the reference image based on the layout information of the reference image and the location of the initial reference pixel.

3. The motion compensating prediction method according to claim 1, wherein determining the location of the target reference pixel of the current pixel in the reference image based on the location of the initial reference pixel comprises:

determining the location of the target reference pixel in the surface of the polyhedron based on the location of the initial reference pixel and the layout information of the reference image, wherein the location of the target reference pixel in the surface of the polyhedron is an intersection point between the surface of the polyhedron and a line connecting the initial reference pixel and the center point of the polyhedron; and determining the location of the target reference pixel in the reference image based on the location of the target reference pixel in the surface of the polyhedron and the layout information of the reference image.

4. The motion compensating prediction method according to claim 3, wherein determining the location of the target reference pixel in the surface of the polyhedron based on the location of the initial reference pixel and the layout information of the reference image comprises:

determining the location of the initial reference pixel in the first plane based on the location of the initial reference pixel and the layout information of the reference image; and determining the location of the target reference pixel in the surface of the polyhedron based on the location of the initial reference pixel in the first plane and the layout information of the reference image.

5. The motion compensating prediction method according to claim 1, wherein the layout information comprises at least one of face quantity information of the polyhedron, sub-image arrangement manner information of the reference image, sub-image arrangement order information of the reference image, or sub-image rotation information of the reference image.

6. The motion compensating prediction method according to claim 1, wherein determining the predicted value of the pixel value of the current pixel comprises determining the pixel value of the target reference pixel as the predicted value of the pixel value of the current pixel.

7. The motion compensating prediction method according to claim 1, wherein determining the predicted value of the pixel value of the current pixel comprises:

weighting the pixel value of the target reference pixel and the pixel value of the neighboring pixel of the target reference pixel; and determining a pixel value that is at the location of the target reference pixel and that is obtained through weighting as the predicted value of the pixel value of the current pixel.

8. The motion compensating prediction method according to claim 1, wherein determining a predicted value of the pixel value of the current pixel comprises:

performing an interpolation operation at the location of the target reference pixel based on the pixel value of the neighboring pixel of the target reference pixel; and determining a pixel value obtained through the interpolation operation as the predicted value of the pixel value of the current pixel.

9. A motion compensating prediction apparatus, comprising:

a memory configured to store instructions; and a processor configured to execute the instructions, which causes the processor to be configured to:

determine a location of an initial reference pixel of a current pixel in a reference image, wherein the current pixel is located in a first sub-image of a current image;

determine a location of a target reference pixel of the current pixel in the reference image based on the location of the initial reference pixel in response to the initial reference pixel being located outside a second sub-image at a location corresponding to the first sub-image in the reference image, wherein a line connects a location of projection of the target reference pixel in a surface of a polyhedron corresponding to the reference image and a location of the initial reference pixel in a first plane passes through a center point of the polyhedron, wherein the location of the target reference pixel in the surface of the polyhedron is determined based on the location of the initial reference pixel and layout information of the polyhedron corresponding to the reference image, wherein the first plane is a plane in which a face corresponding to the second sub-image in the polyhedron lies, and wherein location precision of the target reference pixel is less than or equal to preset pixel location precision; and determine a predicted value of a pixel value of the current pixel based on at least one of a pixel value of the target reference pixel or a pixel value of a neighboring pixel of the target reference pixel.

10. The motion compensating prediction apparatus according to claim 9, wherein the processor is further configured to determine whether the initial reference pixel is located outside the second sub-image in the reference image based on the layout information of the reference image and the location of the initial reference pixel.

11. The motion compensating prediction apparatus according to claim 9, wherein the processor is configured to:

determine the location of the target reference pixel in the surface of the polyhedron based on the location of the initial reference pixel and the layout information of the reference image, wherein the location of the target reference pixel in the surface of the polyhedron is an intersection point between the surface of the polyhedron and a line connecting the initial reference pixel and the center point of the polyhedron; and determine the location of the target reference pixel in the reference image based on the location of the target reference pixel in the surface of the polyhedron and the layout information of the reference image.

12. The motion compensating prediction apparatus according to claim 11, wherein the processor is configured to:

determine the location of the initial reference pixel in the first plane based on the location of the initial reference pixel and the layout information of the reference image; and determine the location of the target reference pixel in the surface of the polyhedron based on the location of the initial reference pixel in the first plane and the layout information of the reference image.

13. The motion compensating prediction apparatus according to claim 9, wherein the layout information comprises at least one of face quantity information of the polyhedron, sub-image arrangement manner information of the reference image, sub-image arrangement order information of the reference image, or sub-image rotation information of the reference image.

14. The motion compensating prediction apparatus according to claim 9, wherein the processor is configured to determine the pixel value of the target reference pixel as the predicted value of the pixel value of the current pixel.

15. The motion compensating prediction apparatus according to claim 9, wherein the processor is configured to:
    weight the pixel value of the target reference pixel and the pixel value of the neighboring pixel of the target reference pixel; and
    determine a pixel value that is at the location the target reference pixel and that is obtained through the weighting as the predicted value of the pixel value of the current pixel.

16. The motion compensating prediction apparatus according to claim 9, wherein the processor is configured to:
    perform an interpolation operation at the location of the target reference pixel based on the pixel value of the neighboring pixel of the target reference pixel; and
    determine a pixel value obtained through the interpolation operation as the predicted value of the pixel value of the current pixel.

17. A motion compensating prediction apparatus, comprising:
    a memory configured to store instructions; and
    a processor configured to execute the instructions, which cause the processor to be configured to:
        determine a location of an initial reference pixel of a current pixel in a reference image, wherein the current pixel is located in a first sub-image of a current image;
        determine a location of a target reference pixel of the current pixel in a surface of a polyhedron corresponding to the reference image based on the location of the initial reference pixel and in response to the initial reference pixel being located outside a second sub-image at a location corresponding to the first sub-image in the reference image, wherein a line connects the location of the target reference pixel in the surface of the polyhedron and a location of the initial reference pixel in a first plane passes through a center point of the polyhedron, and wherein the first plane lies on a face corresponding to the second sub-image in the polyhedron;
        determine a location of the target reference pixel in the reference image based on the location of the target reference pixel in the surface of the polyhedron, wherein location precision of the target reference pixel is less than or equal to preset pixel location precision; and
        determine a predicted value of a pixel value of the current pixel based on at least one of a pixel value of the target reference pixel or a pixel value of a neighboring pixel of the target reference pixel in the reference image.

18. The motion compensating prediction apparatus according to claim 17, wherein the processor is configured to:
    determine the location of the initial reference pixel in the first plane based on the location of the initial reference pixel and layout information of the reference image; and
    determine the location of the target reference pixel in the surface of the polyhedron based on the location of the initial reference pixel in the first plane and the layout information of the reference image.

19. The motion compensating prediction apparatus according to claim 17, wherein the processor is configured to determine the location of the target reference pixel in the reference image based on the location of the initial reference pixel and the layout information of the reference image, wherein the location of the target reference pixel in the surface of the polyhedron is an intersection point between the surface of the polyhedron and a line connecting the initial reference pixel and the center point of the polyhedron.

* * * * *